(12) United States Patent
Rattan et al.

(10) Patent No.: US 11,601,309 B1
(45) Date of Patent: Mar. 7, 2023

(54) MULTI-STAGE CONTINUOUS TIME LINEAR EQUALIZER WITH RECONFIGURABLE INDUCTOR SCHEME

(71) Applicant: 1-VIA LTD, Maidenhead (GB)

(72) Inventors: Suhas Rattan, Reading (GB); Ivaylo Avramov, Maidenhead (GB)

(73) Assignee: 1-VIA LTD

( * ) Notice: Subject to any disclaimer, the term of this patent is extended or adjusted under 35 U.S.C. 154(b) by 0 days.

(21) Appl. No.: 17/670,553

(22) Filed: Feb. 14, 2022

(51) Int. Cl.
*H04L 25/03* (2006.01)
*H04L 25/02* (2006.01)

(52) U.S. Cl.
CPC .... *H04L 25/03885* (2013.01); *H04L 25/0272* (2013.01); *H04L 25/03057* (2013.01)

(58) Field of Classification Search
CPC ............... H04L 25/0272; H04L 25/292; H04L 25/03006; H04L 25/03019; H04L 25/03057; H04L 25/03878; H04L 25/03885; H04L 25/08; H04L 25/085
USPC ................ 375/229, 232, 258, 346, 348, 349
See application file for complete search history.

(56) References Cited

U.S. PATENT DOCUMENTS

| | | | |
|---|---|---|---|
| 8,810,319 B1 * | 8/2014 | Chan ................... | H03F 3/45188 330/253 |
| 9,172,566 B1 * | 10/2015 | Li ...................... | H04L 25/03885 |
| 9,325,319 B1 | 4/2016 | Mishra et al. | |
| 2021/0359883 A1 * | 11/2021 | Delshadpour ..... | H04L 25/03057 |

FOREIGN PATENT DOCUMENTS

| | | | |
|---|---|---|---|
| CN | 111988016 A | * | 11/2020 |
| CN | 112073077 A | | 12/2020 |
| CN | 212435646 U | * | 1/2021 |
| CN | 213461678 U | | 6/2021 |
| IN | 202117003634 | | 3/2021 |
| KR | 10-2020-0013245 | | 12/2019 |
| WO | 2018005137 A1 | | 1/2018 |

* cited by examiner

*Primary Examiner* — Young T. Tse
(74) *Attorney, Agent, or Firm* — Jason C. Cameron

(57) ABSTRACT

A multi-stage continuous time linear equalizer (CTLE) with a reconfigurable inductor scheme is disclosed. The multi-stage CTLE comprises a first stage transformer-based inductive peaking and a second stage resistive load. The first stage transformer-based inductive peaking is configured to control high frequency peaking and set a peak frequency value to a desired value by using a coarse equalization mechanism. The stage resistive load configured to provide tuneable equalization and low frequency fine equalization by using a fine equalization mechanism.

21 Claims, 15 Drawing Sheets

MULTI-STAGE CONTINUOUS TIME LINEAR EQUALIZER WITH RECONFIGURABLE INDUCTOR SCHEME

FIELD OF INVENTION

Embodiments of the present disclosure relates to the field of equalization in high-speed transceivers (i.e., transmitters and receivers), and more particularly to a multi-stage continuous time linear equalizer with a reconfigurable inductor scheme.

BACKGROUND

A Continuous Time Linear Equalizer (CTLE) is a linear filter applied to a receiver which attenuates low-frequency signal content, amplifies the content around the Nyquist frequency, and filters higher frequencies. The CTLE can be adjusted to optimize the ratio of low frequency attenuation to the Nyquist frequency amplification.

Generally, any given communication channel has a low-pass characteristic. This means that beyond the cut-off frequency, the bandwidth of the channel degrades and attenuates the transmitted signal being passed through it. The CTLE within the receiver increases the bandwidth of the channel by attenuating the DC content and boosting the higher frequency (Nyquist frequency) content. Using this characteristic of the CTLE, the bandwidth of a signal is easily recovered, and the signal is amplified to compensate for signal swing losses. However, to recover the received signal in its entirety, there are many other parameters that influence the received signal.

In an exemplary scenario, if an Non-Return to Zero (NRZ) 100 Gigabits per second (Gbps) signal is being transmitted, the maximum signal frequency on a serial link would be 50 Gigahertz (GHz). The latter is known as the Nyquist frequency. To recover a received signal through such a link, the Nyquist frequency is boosted by applying frequency peaking at the Nyquist frequency, where most of the signal energy lies (which in this example is 50 GHz). Hence, conventional receivers are designed for equalizing the received signal at a fixed frequency by means of a CTLE. The problem becomes more complex when such conventional receivers are designed to support multiple signalling data rates such as 10 Gbps, 20 Gbps, 40 Gbps, or 80 Gbps. In such a scenario, the high-frequency peaking has to be achieved at multiple frequencies, which means the peak has to be moved to the Nyquist frequency of each data rate. Therefore, there has to be a mechanism through which the peak can be tuned.

For this, conventional receivers usually have a CTLE which uses standard active or passive inductive peaking. However, a passive inductor cannot be tuned which is required for a CTLE to support different data rates, and thus an active inductor-based CTLE is required. Also, active inductors generate significant noise which is added to the signal which is being recovered. Hence, the recovered signal's Signal-to-Noise Ratio (SNR) is reduced and therefore reduces the Bit Error Rate (BER) performance of the receiver. Moreover, an active inductor is non-linear and in turn, causes non-linearities on the signal being recovered.

Another disadvantage is the high-power consumption associated with using active inductors. Another approach of changing the peaking frequency of the CTLE is to change the output load capacitance value. The change in capacitance would move the peak by limiting the bandwidth of the CTLE while simultaneously sacrificing the amplitude of the peaking. Also, using multiple passive inductors to support multiple data rates as an approach to tune the peak of the CTLE consumes significant area on a semiconductor substrate and increases the parasitic capacitance at the CTLE output thus increasing the power consumption required to drive the parasitics.

Further, some conventional CTLEs use a single inductive load stage, which performs equalization and amplification at a fixed frequency. Decoupling such single inductive load stages to perform equalization at different frequencies and amplification is a non-trivial challenge.

Also, the conventional designs of the CTLE lacks the ability to auto-calibrate for different signalling schemes and different communication interfaces or channels. Therefore, there is a need for a multi-stage CTLE with a reconfigurable inductor scheme and a method thereof to address the aforementioned issues.

BRIEF SUMMARY OF THE INVENTION

In accordance with an embodiment of the present disclosure, a multi-stage CTLE with a reconfigurable inductor scheme is disclosed. The multi-stage CTLE with a reconfigurable inductor scheme comprises a first stage transformer-based inductive-peaking configured to control high frequency peaking and set the peaking frequency to a desired value by utilizing a coarse equalization mechanism. The first stage transformer-based inductive peaking comprises a first active transconductance ($G_{m1}$) employed with current reuse topology to improve power consumption for a given amplification. The first stage transformer-based inductive peaking further comprises a passive transformer-based inductive load based on a transformer structure. The passive transformer-based inductive load in the transformer structure comprises a primary coil composed of a center-tap differential inductor ($L_1$) configured to provide symmetric structure for signal amplification. The passive transformer-based inductive load based on a transformer structure further comprises a common-mode-voltage fed through a center tap. The passive transformer-based inductive load based on the transformer structure further comprises a secondary coil ($L_2$) electromagnetically coupled to the primary coil. The secondary coil comprises a passive resistor ($R_2$) placed in parallel to the secondary inductor ($L_2$). The passive transformer-based inductive load based on the transformer structure further comprises a load resistor ($R_L$) electrically connected in series with the first active transconductance ($G_{m1}$) and the passive transformer-based inductive load. The multi-stage CTLE with a reconfigurable inductor scheme comprises a second stage resistive load configured to provide tuneable low-frequency fine equalization by utilizing a fine equalization mechanism. The second stage resistive load comprises a second active transconductance ($G_{m2}$) employed with current reuse topology. The second active transconductance ($G_{m2}$) comprises a source degeneration network of resistance and capacitance. The resistance and capacitance are implemented by using a MOSFET switch in triode and varactor diode respectively.

Embodiments of the present disclosure includes a multi-stage CTLE method with a reconfigurable inductor scheme. The method comprises calibrating a first stage transformer-based inductive peaking and a second stage resistive load by calibrating an inductor value in the first stage transformer-based inductive-peaking by changing the value of resistor ($R_2$) digitally via a Digital to Analog Convertor (DAC) in order to control high frequency peaking. The method further comprises calibrating a first stage transformer-based inductive peaking and a second stage resistive load by controlling load resistor ($R_L$) value to be approximately in the middle of a predefined range to provide coarse equalization via controlling the low-frequency gain. The method further comprises calibrating a first stage transformer-based inductive peaking and a second stage resistive load by controlling a source degeneration network of resistance and capacitance to provide equalization. The method also comprises calibrating a first stage transformer-based inductive peaking and a second stage resistive load by performing equalization dynamic range check to ensure the CTLE has sufficient dynamic range to counteract effects across Process, Voltage and Temperature (PVT).

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
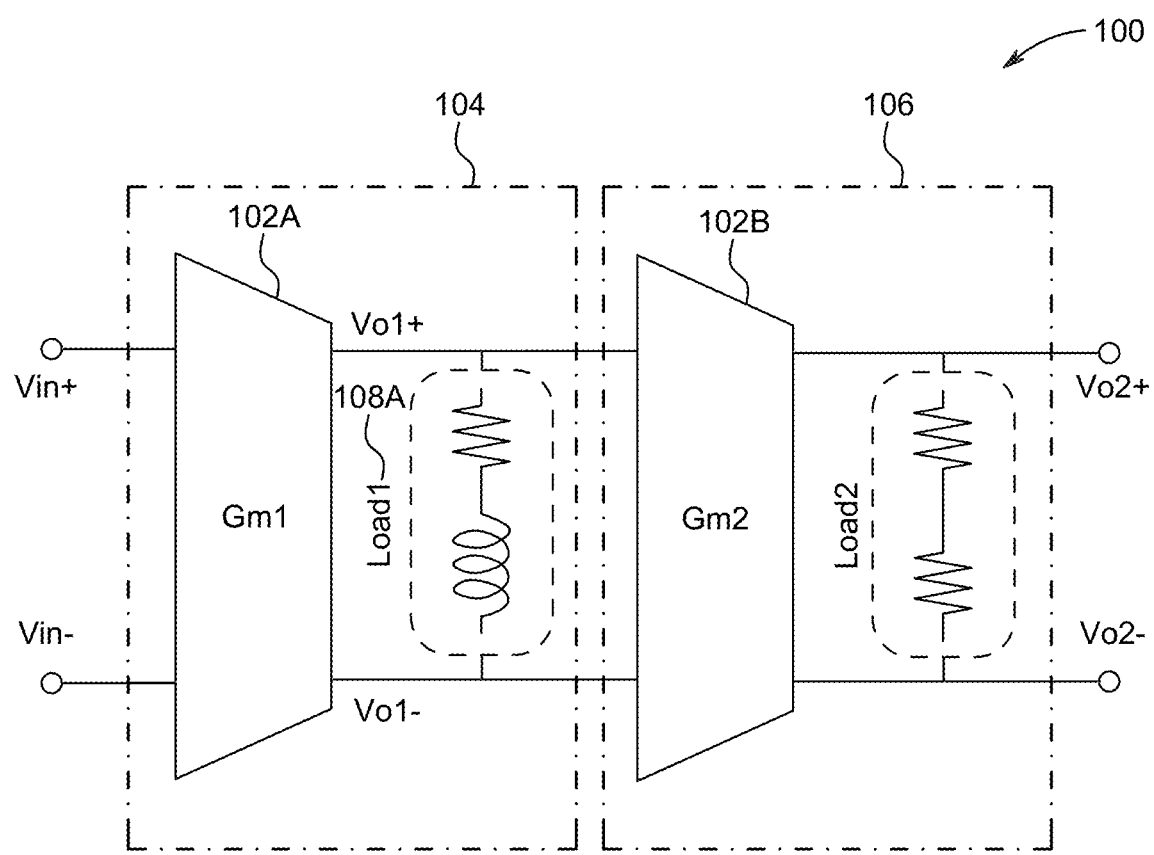
FIG. 1 is a circuit diagram illustrating an exemplary multi-stage CTLE with reconfigurable inductor scheme in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A CTLE for amplification of high-speed signals at the receiver front-end is disclosed. A new topology for multi-band applications is developed, which facilitates layout integration and leads to a compact and power-efficient design. The key elements of the apparatus are as follows: a transformer-based passive-inductive peaking for the load of an amplifier; a current-reuse topology for active circuitry to improve power efficiency, and digitally configurable elements to adapt the amplifier frequency response through digital calibration loops.

Unlike a conventional classic transformer which has two coils and uses an alternating current fed into the first coil to create a magnetic field, which then couples onto a secondary coil and then generates a current and voltage in the secondary coil, the present disclosure uses the secondary coil to induce a magnetic field change into the first coil and changes the effective inductance of the first coil. This is achieved by adding a resistive load where a resistor bank comprising a plurality of resistors is connected in parallel with the secondary coil. Alternatively, digitally-controlled switches, which connect the two coils, in parallel is used. This structure reduces the resistance to a minimum or increases the resistance to a maximum. Alternatively, another scheme is used to replace the resistor with an active resistor based on a MOSFET device which is controlled through a DAC. This allows the apparatus to trim the effective resistance across the secondary coil, which then induces a magnetic field into the first coil and changes the effective inductance. As with this inventive design, inductance can be trimmed by using the transformer-based approach by a factor of up to 8×, allowing the receiver to cover various distinct frequency bands.

FIG. 1 is a circuit diagram illustrating an exemplary multi-stage CTLE 100 with a reconfigurable inductor scheme in accordance with an embodiment of the present disclosure. In an embodiment, a multi-stage CTLE 100 with a reconfigurable inductor scheme is disclosed. The multi-stage CTLE 100 comprises a first stage transformer-based inductive-peaking 104. The first stage transformer-based inductive-peaking 104 is configured to control high frequency peaking and set the peaking frequency value to a desired value by utilizing a coarse equalization mechanism. The first stage transformer-based inductive-peaking 104 comprises a first active transconductance ($G_{m1}$) 102A employed with current reuse topology to improve power consumption for a given amplification. The first stage transformer-based inductive-peaking 104 further comprises a passive transformer-based inductive load 108A. The passive transformer-based inductive load 108A is based on a transformer structure that comprises a primary coil composed of a center-tap differential inductor ($L_1$) configured to provide a symmetric structure for signal amplification. The passive transformer-based inductive load 108A further comprises a common-mode-voltage ($V_{CM}$) fed through a center tap. The passive transformer-based inductive load 108A further comprises a secondary coil ($L_2$) electromagnetically coupled to the primary coil. The secondary coil comprises a resistor ($R_2$) placed in parallel to the secondary inductor ($L_2$). The passive transformer-based inductive load 108A further comprises a load resistor ($R_L$) electrically connected in series with the first active transconductance ($G_{m1}$) 102A and the passive transformer-based inductive load 108A. The multi-stage CTLE 100 further comprises a secondary stage resistive load 106 configured to provide tuneable low frequency fine equalization by utilizing a fine equalization mechanism. The second stage resistive load 106 further comprises a second active transconductance ($G_{m2}$) 102B employed with current reuse topology. The second active transconductance ($G_{m2}$) 102B also comprises a source degeneration network composed of resistance and capacitance. The resistance and capacitance are implemented using a MOSFET switch in triode and varactor diode respectively. The first stage transformer-based inductive-peaking 104 and the second stage resistive load 106 are calibrated by utilizing a coarse equalization mechanism and a fine equalization mechanism respectively.

The coarse equalization mechanism comprises calibrating the inductor value in the first stage transformer-based inductive-peaking 104 by changing the value of the resistor ($R_2$) digitally via a DAC in order to control high frequency peaking. In operation, the entire CTLE 100 (i.e., stage 1+stage 2) needs to be calibrated. In one embodiment, an inductor value is calibrated in the first stage transformer-based inductive-peaking 104. The first stage transformer-based inductive-peaking 104 controls the high frequency peaking and a second stage resistive load 106 provides the low frequency equalization. Hence, this mandates a calibration algorithm to be sequenced in the following steps.

At the first step, the inductor value is calibrated in the first stage transformer-based inductive-peaking 104. This is done at start-up of the receiver by measuring the amplitude of high-frequency pulses (i.e., Nyquist pulses) by employing digital pattern filtering. The value of $R_2$ is constantly changed by the digital pattern filtering through the DAC hence moving the peak of the CTLE 100. This is performed in a monotonic fashion from the lowest value of resistance to the highest value of resistance.

At the second step, the load resistor ($R_L$) is controlled in the first stage transformer-based inductive-peaking 104 to provide coarse equalization. $R_L$ in the first stage transformer-based inductive-peaking 104 is initially selected such that it provides equalization that it is approximately in the middle of the usable range of available coarse equalization that can be obtained from $R_L$ in the first stage transformer-based inductive-peaking 104. This is referred to as the coarse equalization mechanism.

The first stage transformer-based inductive-peaking 104 and the second stage resistive load 106 are further calibrated by employing a fine equalization mechanism. The fine equalization mechanism comprises controlling the source degeneration network of the resistance and capacitance to provide the fine equalization. The source degeneration network is controlled in the second stage resistive load 106 to provide fine equalization. Once the appropriate inductance value is found out from the above step and selected such that $R_L$ is approximately in the middle of the usable range, the fine equalization of the CTLE 100 is calibrated with the source degeneration network resistance and capacitance present.

Figure 10:
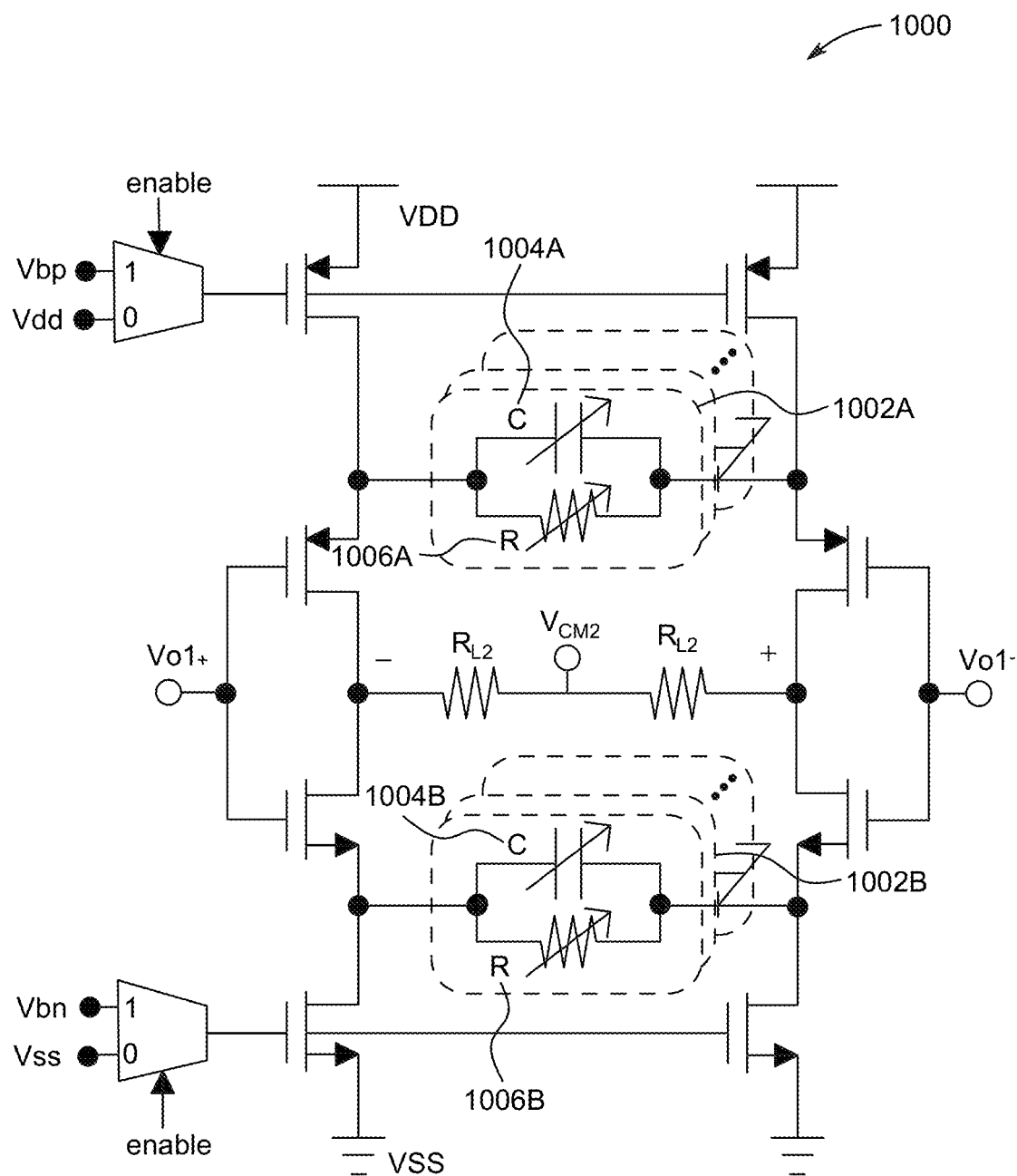
FIG. 10 is a circuit diagram illustrating a second active transconductance in accordance with an embodiment of the present disclosure.

This is done by connecting and disconnecting one or more source degeneration slices 1002A-B (as described in FIG. 10). By connecting more degeneration slices 1002A-B in parallel, the low frequency gain is increased, thereby reducing the overall equalization achieved by the CTLE 100. By disconnecting the source degeneration slices 1002A-B which are in parallel, the low frequency gain is reduced, thereby increasing the overall equalization achieved by the CTLE 100. The number of source degeneration slices 1002A-B which are connected or removed from the parallel configuration are determined by monitoring the pulse response of the incoming signal and carrying one or both of the following two measurements: peak to pre- and post-cursor ratio and $H_2$ annulment.

The peak to pre- and post-cursor ratio is a technique which aims to maximize the ratio of the peak of the pulse response of the incoming signal (referred to as H(0) in conventional literature) to the rms square sum of the pre- and post-cursors of the pulse response. The measurement is calculated by:

$$\text{Peak-pre-and post-cursor ratio} = \frac{H_0}{\sqrt{\left(\sum_{2}^{n} H_i^2 + \sum_{m}^{-1} H_j^2\right)}} \quad \text{equation (1)}$$

In such an embodiment, n is the number of post-cursor taps and m is the number of pre-cursor taps. Using a greater number of taps increases accuracy, however at the cost of computation, speed, power, and latency.

$H_2$ annulment is a measurement of the pulse response of the incoming channel while changing or adapting the equalization. In such embodiment, the $H_2$ post cursor is equal to zero and is given by:

$$H_2 = 0 \quad \text{equation (2)}$$

The fine equalization mechanism further comprises performing an equalization dynamic range check to ensure the CTLE 100 has sufficient dynamic range to counteract effects across PVT. The fine equalization procedure is terminated when a target value of either-or the two measurements are reached. The equalization dynamic range check is performed by determining whether the fine equalization code in the second stage resistive load is not centered or optimal. The equalization dynamic range check is further performed by changing the value of the load resistance ($R_L$) during the fine equalization mechanism based on the following conditions.

In other words, in order to ensure the CTLE 100 has enough dynamic range to counteract the effects across PVT, it is to be ensured that CTLE 100 fine code in the second stage resistive load 106 should be somewhere in the middle of the usable range. For example, if the usable range from the equalization code is in the range of 1-10, at the end of the calibration procedure, then the equalization code should be between 4-7, where 5 or 6 is the optimal value. If the equalization code is between 1-3 (referred as the lower code bound) or 7-10 (referred as the upper code bound), it is not centered and does not have enough dynamic range to counteract the change in equalization due to PVT. In the event the code is not centered, the load resistor ($R_L$) is controlled in the first stage transformer-based inductive-peaking 104 to change the coarse equalization based on the following conditions.

In condition A, if the fine equalization code is equivalent to a lower code bound, then the value of the load resistance $R_L$ is increased by $R_L$ Code=$R_L$ Code+1 resulting in a decrease in the amount of the coarse equalization in the first stage transformer-based inductive-peaking 104 and thereby increasing the fine equalization required in the second stage resistive load 106.

In condition B, if the fine equalization code is equivalent to an upper code bound, then the value of the load resistance $R_L$ is decreased by $R_L$ Code=$R_L$ Code−1 resulting in increase in the amount of coarse equalization in the first stage transformer-based inductive-peaking 104 and thereby reducing the fine equalization required in the second stage resistive load 106.

The steps of controlling the load resistor ($R_L$) value to be approximately between a middle value of a predefined range, and controlling the source degeneration network of the resistance and the capacitance in the second stage to provide fine equalization and performing equalization dynamic range checks to ensure the CTLE 100 has sufficient dynamic range to counteract effects across PVT are repeated until the fine equalization code is determined to be in the centered code region, code 4-7.

In operation, the calibration is performed by changing the resistor which is controlling the secondary coil. When the peak is moved from DC to near the Nyquist frequency, two different frequency points are measured: the gain at high frequency (i.e. Nyquist frequency) and the gain at DC. When the power of DC and the high frequency are the same, then it is understood that the peaking is at the optimal frequency. In case of over-equalization, this means that the energy in the higher frequency band is more than the lower frequency band. In case of under-equalization, the energy in the lower frequency band will be higher than the energy in the high frequency band. Hence, when the energy in both the bands are equal, this is where we obtain the optimum resistance value. When the circuit is running and is in what is called a 'mission mode', live data is received at the operating temperature of the circuit and when the temperature of the circuit drifts, subsequently drifting all of the physical characteristics of devices in the circuit. In order to obtain enough dynamic range to ensure optimal equalization is achieved, there are 10 fine equalization settings, namely 0 until 9. In one example, if the equalization setting is at value 9, and if the temperature increases, there are no more fine equalization settings available. To overcome the latter issue, the value of $R_L$ in the first stage transformer-based inductive-peaking 104 is selected to provide a fine equalization code to be approximately in the middle of the usable range. This is referred to as the coarse equalization mechanism. Once the right inductance is found, which is obtained through step one, step two obtains the right amount of fine equalization to be in the middle of the desired range. Then, the fine equalization is initiated at the second stage resistive load 106. This is done by disconnecting the source degeneration network slices 1002A and 1002B.

The first active transconductance ($G_{m1}$) 102A and the second active transconductance ($G_{m2}$) 102B are employed with current reuse topology by using a stacked NMOS/PMOS amplifier. The multi-stage CTLE 100 supports non-return-to-zero (NRZ) signalling and Pulse Amplitude Modulation for X-levels (PAM-X). The passive transformer-based inductive load 108A employs a single structure for different frequencies. The resistor corresponds to a transistor-based resistor. The gate of the transistor is driven digitally by a DAC. The configuration bits received by the DAC is converted into a voltage which drives the transistor-based resistor. The second stage resistive load 106 further comprises a variant which only has one source degeneration network of resistance and capacitance either or both on NMOS transistors or a PMOS transistor section.

The CTLE's purpose is to compensate for the loss of high-frequency components of the transmitted analog signal which are caused by attenuation and dispersion of the signal propagating along the transmission channel. The first stage transformer-based inductive-peaking 104 provides low-noise amplification and employs transformer-based inductive-peaking. The second stage resistive load 106 provides tuneable equalization with enough signal swing at the output. The second stage resistive load 106 provides more linearity and larger swings and employs a resistive load to minimize the required die area on the substrate.

Conventionally, any CTLE comprises a single stage to achieve equalization. However, in the present embodiment, the CTLE 100 comprises two stages. One stage is used to control the peak frequency. The other stage is used to control equalization. Equalization herein refers to the difference between high frequency gain and DC gain. In the first stage, i.e., the $G_{m1}$ 102A stage, is the peak control. The second stage is the equalization control. The second stage resistive load 106 is implemented with a variant which only has one source degeneration resistance and capacitance either in the NMOS or PMOS section later described in FIG. 10.

Figure 2:
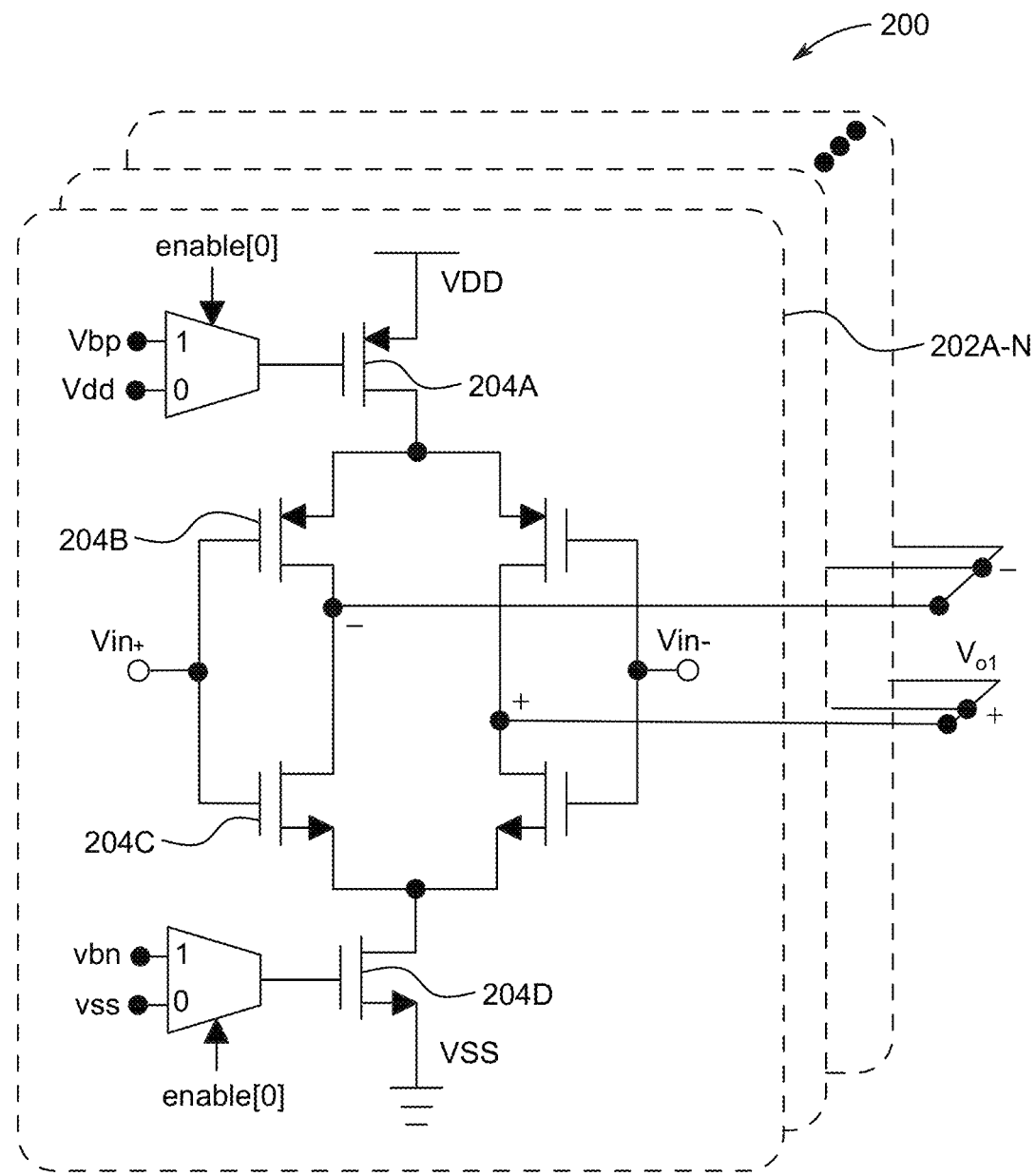
FIG. 2 is a block diagram illustrating an exemplary current-reuse transconductance in accordance with an embodiment of the present disclosure.

FIG. 2 is a block diagram 200 illustrating additional details about an exemplary current re-use transconductance 102A-N as described in FIG. 1, in accordance with an embodiment of the present disclosure. The first active transconductance ($G_{m1}$) 102A is composed of a plurality of slices 202A-N which is turned ON-OFF independently through digital control. Such an approach enables the receiver to adapt for different data rates, where higher or lower transconductance is required based on the data rate. Moreover, in such an embodiment, the design saves power by turning OFF some of the slices 202A-N when less amplification is needed. In one specific embodiment, the mechanism to enable or disable slices 202A-N is through digital configuration at start-up, and such operation is maintained during data reception.

The first stage transformer-based inductive-peaking 104 also includes a passive transformer-based inductive load 108A based on a transformer structure. The first stage transformer-based inductive-peaking 104 uses a current reuse topology. One benefit of a current reuse topology is to consume half the power for a given amplification. Conventionally, a differential pair, which has two transistors and a current source connected to a load, is used as an amplifier. Hence, the intrinsic gain of the amplifier is the transconductance of a device and the resistance value of the resistor. To boost the gain, either the resistor value is increased or the transconductance is increased. The transconductance is dependent on two parameters, which are dimensions of either the input pair devices or the current. Hence, in the current reuse topology, the signal is driven into two transistors, one being PMOS and the other is NMOS. This $G_m$ stage or the current reuse amplifier is coupled with the transformer of the present disclosure to provide a novel frequency characteristic. Here, gain is defined by $g_p=g_{mp}$ for the PMOS 204B and then for an extra driving transistor, which is the NMOS 204C, $g_n=g_{mn}$ times, the resistance of the series resistance of the coil. Hence, we obtain twice the gain for the same current. Therefore, the present design of CTLE 100 is more current-efficient.

In FIG. 2, multiple slices 202A-N of the first stage transformer-based inductive-peaking 104 is disclosed. These slices 202A-N are arranged in parallel. In case the gain must be increased, some slices 202A-N are tuned on and some slices 202A-N are tuned off. Each of these slices 202A-N are adjustable. Hence, the slices 202A-N only control the gain across the entire spectrum (i.e., from DC to the Nyquist frequency), however the peaking frequency is controlled by the coil. The multiple slices 202A-N are used to change the overall gain characteristics. In one example if multiple slices 202A-N are turned on and there exists too much gain in the transfer function of the equalized signal spectrum, the entire curve needs to be moved down by removing some of the slices 202A-N. Therefore, in the first stage transformer-based inductive-peaking 104, the $G_{m1}$ 102A is composed of several slices 202A-N that can be turned on and off independently. Each slice is identical except for individual enable signals. These enable signals enables and disables each slice 202A-N connected to the current sources both at the top (PMOS current source 204A) and the bottom (NMOS current source 204D). This achieves high impedance.

Essentially, the overall gain is changed depending on how much gain is required. Further, the amount of gain required decides enabling and disabling slices 202A-N. Hence, each slice 202A-N has different enable signals. If there are 15 slices 202A-N, there are 15 enable signals which enables or disables the slices 202A-N. Each of the slices 202A-N are thermometrically weighted and hence all carry the same current.

Figure 3:
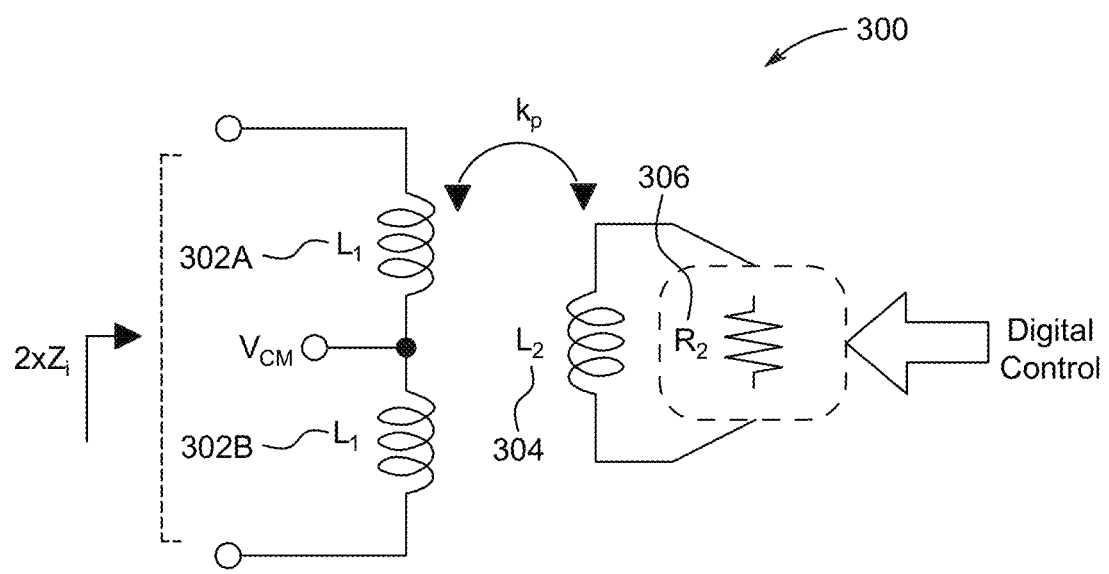
FIG. 3 is a circuit diagram illustrating an exemplary passive transformer-based inductive load in accordance with an embodiment of the present disclosure.

FIG. 3 is a circuit diagram 300 illustrating an exemplary passive transformer-based inductive load 108A in accordance with an embodiment of the present disclosure. A controlling value of the resistor ($R_2$) 306, which can be either active or passive on the secondary coil, modifies the effective inductance at the primary coil. The effective inductance is the mathematically imaginary part of input impedance ($Z_{in}$) and can be found by substituting for the Laplace transform:

$$s=\sigma+j\omega \qquad \text{Equation (3)}$$

The input impedance is computed by:

$$Z_{in} = L_1 s \times \left(1 - \frac{k_p^2 L_2 s}{R_2 + L_2 s}\right) \qquad \text{Equation (4)}$$

The differential inductive load is based on a transformer structure and employs a single structure for different frequencies. The key feature that enables the inductor to be tuned continuously is the resistor ($R_2$) 306 which can be either active or passive is placed on a secondary coil, and can be tuned (increased or decreased) by digital configuration. The passive transformer-based inductive load 108A includes a primary coil composed of a center-tap differential inductor ($L_1$) 302A-B. The primary coil 302A-B is configured to provide a symmetric structure for signal amplification.

The passive transformer-based inductive load 108A also includes a $V_{CM}$ which is fed through a center tap. The passive transformer-based inductive load 108A also includes a secondary coil electromagnetically coupled to the primary coil. The secondary coil comprises a resistor ($R_2$) 306 which can be either active/passive and placed in parallel to a secondary inductor ($L_2$) 304. The first stage transformer-based inductive-peaking 104 also includes a load resistor ($R_L$) electrically connected in series with the first active transconductance ($G_{m1}$) 102A and the passive transformer-based inductive load 108A. The primary coil is composed of a center-tap differential inductor ($L_1$) 302A-B that provides a symmetric structure for signal amplification.

In one embodiment, the $V_{CM}$ of the CTLE output is fed through the center tap. The first differential inductor ($L_1$) 302A-B and the second inductor ($L_2$) 304 turns are coupled to each other electromagnetically. The coupling factor is $k_p$. To show how controlling the resistor ($R_2$) 306 connected in parallel to the secondary coil can modify the effective inductance seen at the primary coil (i.e., seen by $G_{m1}$ (102A)), the input impedance transfer function can be calculated by applying the following equation in the Laplace domain (s-domain) as given below in equation-5:

$$Z_{in} = L_1 s \times \left(1 - \frac{k_p^2 L_2 s}{R_2 + L_2 s}\right) \qquad \text{Equation (5)}$$

The effective inductance is the imaginary part of $Z_{in}$ and can be computed by substituting for:

$$s=\sigma+j\omega \qquad \text{Equation (6)}$$

As can be seen from equation-5, when $R_2$ 306 is 0, the effective inductance seen from the first turn is:

$$L_1(1-k_p^2)$$ Equation (7)

When $R_2$ 306 is very large (i.e., $R_2 \to \infty$), the effective inductance reaches ($L_1$) 302A (i.e., $Z_{in} \to L_1 s$). In such an embodiment, the deduction is used to change the effective inductance by changing a resistor, whereby multiple inductors are not needed to support different frequency bands. Moreover, the present transformer-based inductor design is implemented in CMOS technology using top-metal layers (which have lower resistivity and less parasitic capacitance to the substrate, resulting in lower signal loss) in a very compact structure (e.g., 50 μm×50 μm) in this scenario. The transformer structure is extracted by an electromagnetic field solver and simulated in a SPICE simulator to check the effective inductance.

The transformer structure has the differential coil $L_1$ 302A-B, the secondary coil ($L_2$) 304 and a coupling factor $k_p$. In operation, the resistance $R_2$ 306 in the secondary coil ($L_2$) 304 is digitally tuned. In a typical transformer, the primary coil has one voltage as the input and the secondary coil has the other voltage as an output. By controlling the value of parallel resistance $R_2$ 306, one can control the current flow in the secondary windings, therefore the strength of the magnetic field on $L_2$ 304 can be adjusted. This yields a fine control over the induced magnetic field from $L_2$ 304 to $L_1$ 302A-B, thus the effective inductance seen from the primary windings $L_1$ 302A/B can be adjusted.

In the above equation (5), the impedance $Z_{in}$ of the circuit is mathematically summarized. Clearly in this mathematical representation, if the resistance $R_2$ 306 is zero, the input impedance $Z_{in}$, is then equivalent to approximately $L_1*(1-(k_p)^2)$. If the resistance $R_2$ 306 is very large ($R_2 \to \infty$), the input impedance $Z_{in}$ is approximately equivalent to $L_1$ 302A-B. This allows changes to the inductance purely by controlling the resistor $R_2$ 306.

Figure 4:
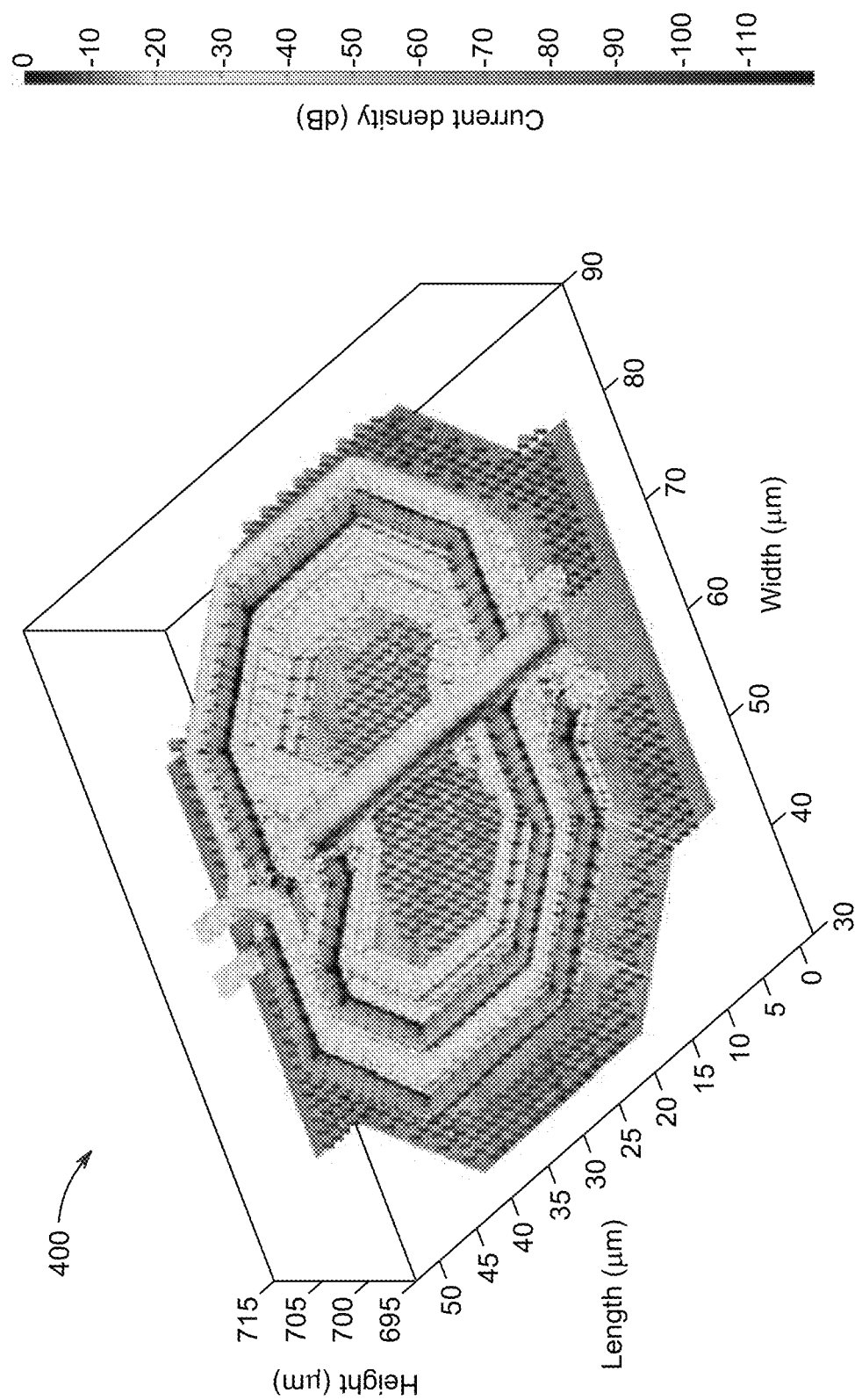
FIG. 4 is a schematic representation of CMOS layout design for transformer-based inductor using top metal layers in accordance with an embodiment of the present disclosure.

FIG. 4 is a layout representation of a CMOS layout design 400 for transformer-based inductors using top-metal layers in accordance with an embodiment of the present disclosure. The simulation results 500 of FIG. 5 depicts the changes in the effective inductance of the center-tap differential inductor $L_1$ 302A-B by changing the value of resistor $R_2$ 306 on the secondary coil.

Figure 5:
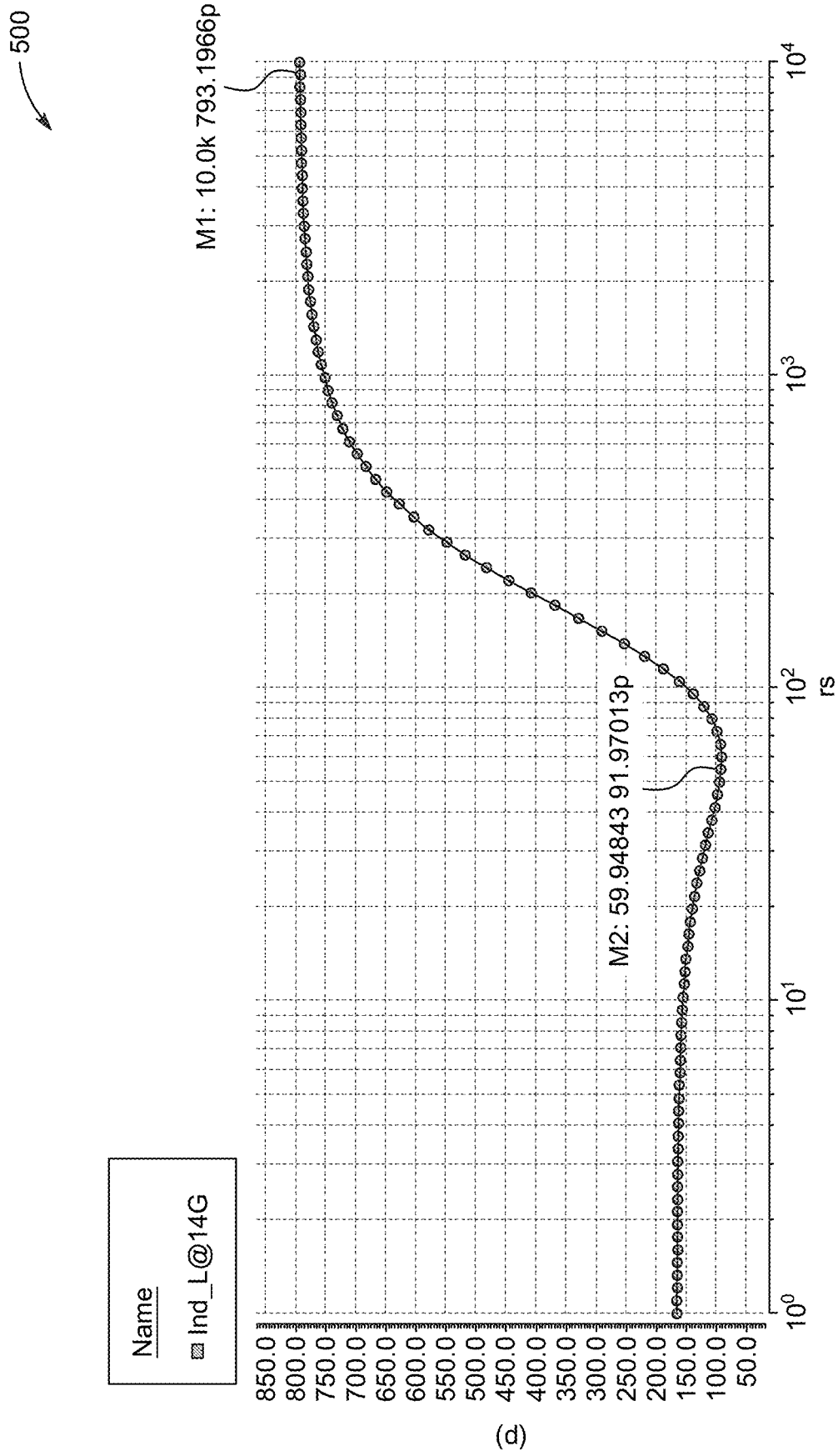
FIG. 5 is a graphical representation depicting simulation of change in effective inductance with respect to passive resistor ($R_2$) of the secondary coil, in accordance with an embodiment of the present disclosure.

FIG. 5 is a graphical representation 500 depicting a simulation of change in effective inductance of the center-tap differential inductor $L_1$ 302A-B with respect to resistor $R_2$ 306 of the secondary coil in accordance with an embodiment of the present disclosure. As the simulation results 500 shows the effective inductance changing from 91.9 pH to 793 pH, an 8× tuneability range can be achieved.

Figure 6:
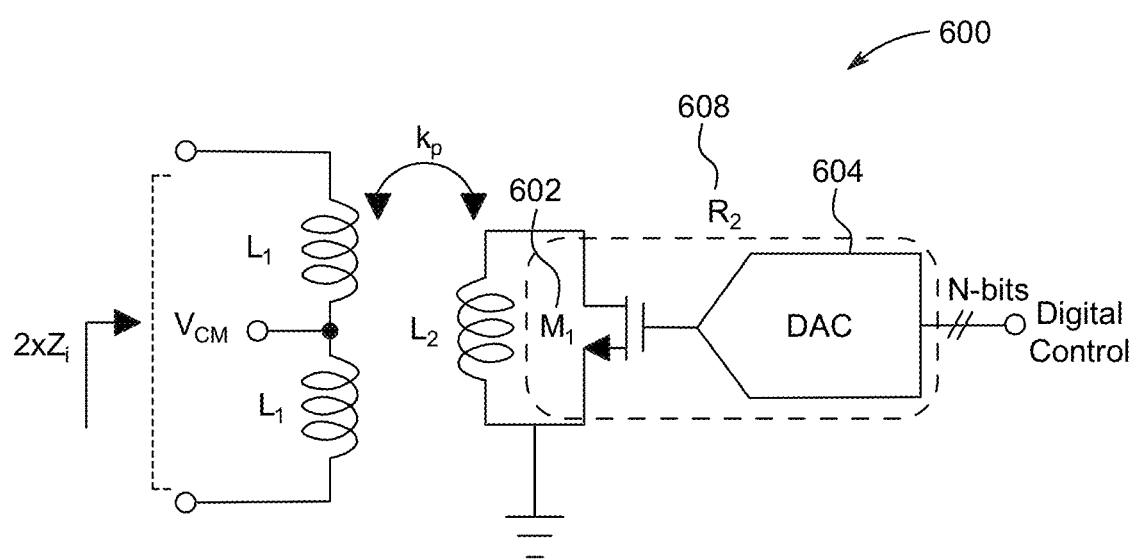
FIG. 6 is a circuit diagram of a transistor-based resistor for tuneable resistor realization in accordance with an embodiment of the present disclosure.

FIG. 6 is a circuit diagram of a transistor-based resistor for a tuneable resistor realization 600 in accordance with an embodiment of the present disclosure. A DAC 604 receives the configuration bits in digital form, converts them to an analog voltage, and drives the gate of the NMOS transistor (or alternatively, a PMOS device) by the voltage. In such an embodiment, the effective value of the inductor can be controlled precisely without the use of bulky passive resistors. Therefore, enabling the transformer-based inductor structure to be compact in size adds only low-parasitic capacitance to the substrate of the circuit. The proposed design helps to enhance the bandwidth as well. In this circuit configuration, the voltage across the drain of the transistor 602 is not defined, and the source of the transistor 602 is connected to ground. Hence, by default, the transistor 602 is always in the triode region thus being configured as a resistor.

Figure 7:
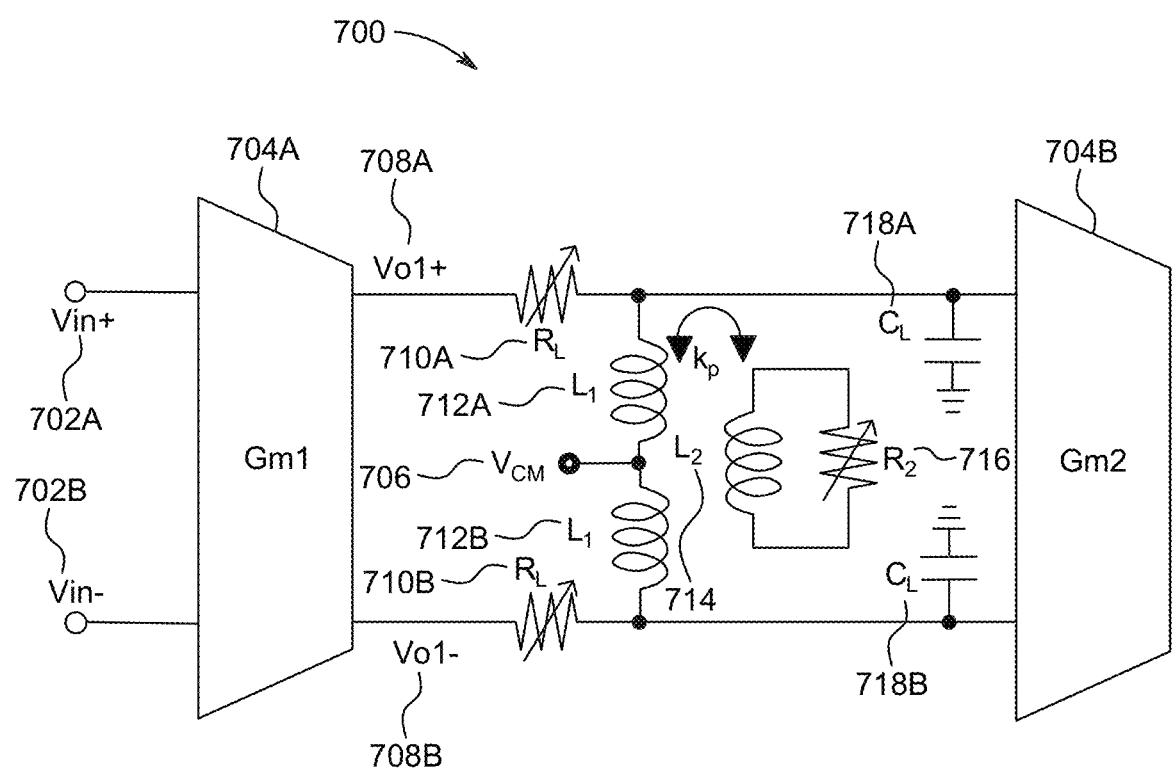
FIG. 7 is a circuit diagram illustrating an exemplary multi-stage CTLE where the first active transconductance is implemented with the load, in accordance with an embodiment of the present disclosure.

FIG. 7 is a circuit diagram illustrating an exemplary multi-stage CTLE 700 where the first active transconductance 704A is implemented with a load in accordance with an embodiment of the present disclosure. A transfer function of the first stage transformer-based inductive-peaking 104 is computed by:

$$H(s) = \frac{V_{o1}(s)}{V_{in}(s)} = G_{m1} \times Z_{load}(s) =$$

$$(g_{mn} + g_{mp}) \times \frac{R_L R_2 + s(R_L L_2 + L_1 R_2) + s^2 L_1 L_2 (1 - k_p^2)}{R_2 + s(L_2 + C_L R_L R_2) + s^2(R_L L_2 C_L + L_1 R_2 C_L) + s^3 L_1 L_2 C_L (1 - k_p^2)}$$

Equation (8)

where H(s) is the transfer function. In this case, $V_{o1}(s)$ 708A-B is the output voltage of the first stage transformer-based inductive-peaking 104. In this embodiment, $V_{in}(s)$ 702A-B is the input voltage to the first stage transformer-based inductive-peaking 104, $G_{m1}$ 704A is the first active transconductance, $Z_{load}(s)$ is the load impedance, $g_{mn}$ is the transconductance of the NMOS device in the differential pair, and $g_{mp}$ is the transconductance of the PMOS device in the differential pair respectively. Further, $R_L$ 710A-B is the load resistor, $R_2$ 716 is an active/passive resistor, $C_L$ 718A-B is the load capacitance, $L_1$ 712A-B is the differential inductor (which forms the primary coil of the transformer), $V_{CM}$ 706 is the common-mode-voltage source which is fed through to the center tap of the center-tap differential inductor $L_1$ 712A-B and provides the output common-mode-voltage of the first stage transformer-based inductive-peaking 104, $L_2$ 714 is the secondary inductor, $k_p$ is the coupling factor, and s is the Laplace transform symbol:

$$(s = \sigma + j\omega)$$ equation (9)

The load impedance value $Z_{load}(s)$ is given by:

$$Z_{load} = \frac{1}{C_L s} \| (R_L + Z_{in})$$ equation (10)

The multi-stage CTLE 700 further comprises a CMOS topology enabling a high-Q load inductor to be realized with the resistors $R_L$, 710A-B in series with the first winding of the transformer-based inductor. The output common-mode is defined by a low-impedance $V_{CM}$ 706 source connected to the center tap of the first winding. The CMOS topology enables a variable output common-mode as the output common-mode is defined by a low-impedance $V_{CM}$ 706 source connected to the center tap of the first winding.

The transfer function of the first stage transformer-based inductive-peaking 104 can be calculated as $$Z_{in} = L_1 s \times \left(1 - \frac{k_p^2 L_2 s}{R_2 + L_2 s}\right)$$ equation (11)

$$Z_{load} = \frac{1}{C_L s} \| (R_L + Z_{in})$$ equation (12)

$$H(s) = \frac{V_{o1}(s)}{V_{in}(s)} = G_{m1} \times Z_{load}(s) =$$

$$(g_{mn} + g_{mp}) \times \frac{R_L R_2 + s(R_L L_2 + L_1 R_2) + s^2 L_1 L_2 (1 - k_p^2)}{R_2 + s(L_2 + C_L R_L R_2) + s^2(R_L L_2 C_L + L_1 R_2 C_L) + s^3 L_1 L_2 C_L (1 - k_p^2)}$$

equation (13)

As can be seen from equation-11, changing $R_2$ 716 can move the CTLE 700 peak and provides a tuneable peak-frequency by using a single compact transformer-based inductor. The stated characteristic is useful for multi-band CTLE applications and empowers the receiver to support multiple protocols (i.e., different data rates). A simulation for this circuit configuration/structure is further described in FIG. 8.

In an embodiment, the input capacitance of the second stage resistive load 106 loads the first stage transformer-based inductive-peaking 104. The second transconductance $G_{m2}$ 704B is a copy of the first transconductance $G_{m1}$ 704A. Whenever there exists a gain in the transconductance stage 704A and 704B, it induces an input capacitance known as a Miller capacitance at the input of the stage, which is equal to the gain of the transconductance of the stage multiplied by the parasitic drain-gate capacitance ($C_{dg}$) of the input pair transistors. The second stage forms the dominant capacitance of this multi-stage CTLE 700.

Figure 8:
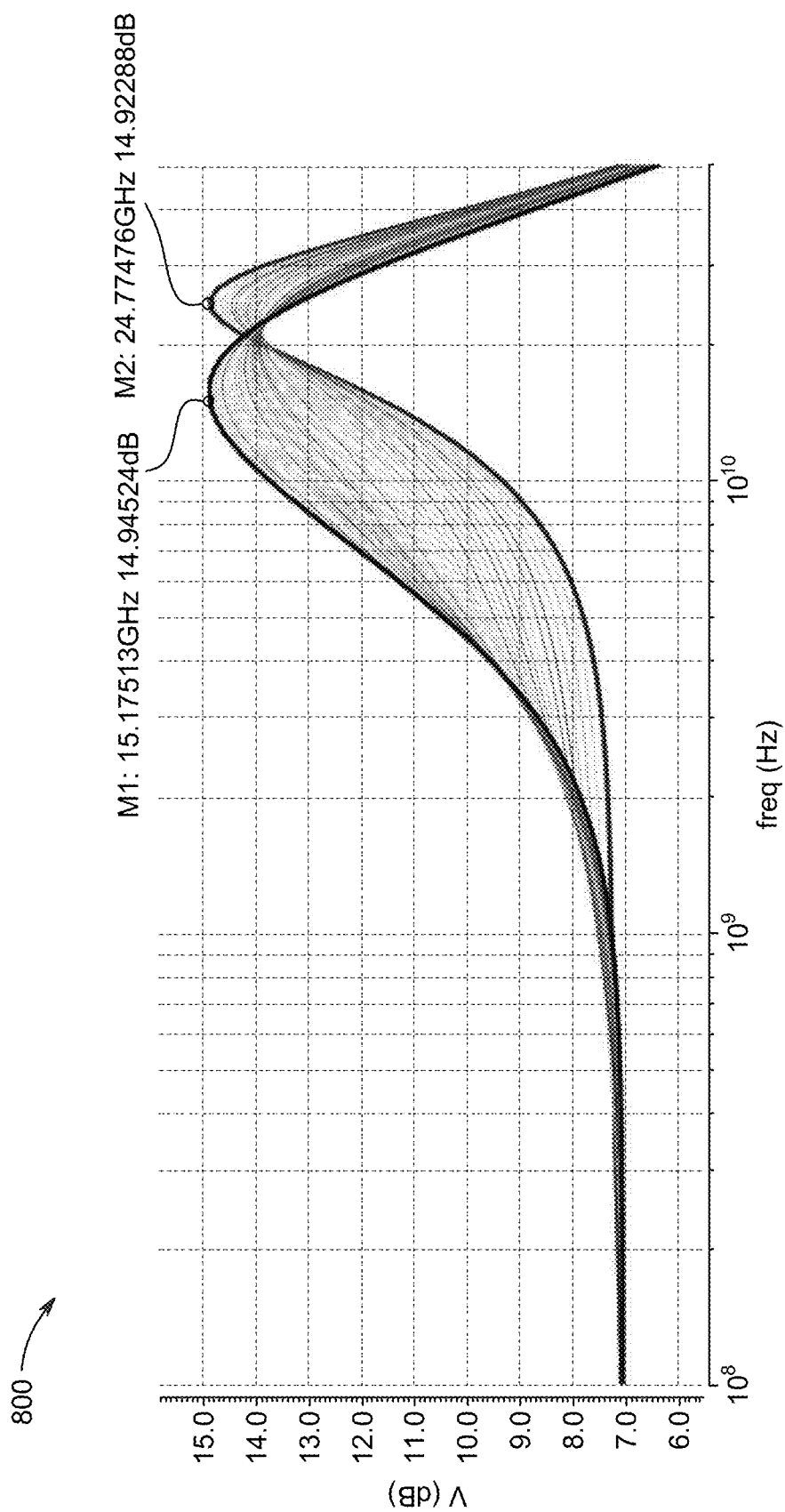
FIG. 8 is a graphical representation depicting simulation of tuneable peak-frequency by using a transformer-based inductor in accordance with an embodiment of the present disclosure.

FIG. 8 is a graphical representation 800 depicting a simulation of the tuneable peak-frequency by using a transformer-based inductor in accordance with an embodiment of the present disclosure. As shown here, changing $R_2$ 306 can effectively move the amplifier peak-frequency from 14.9 GHz up to 24.77 GHz.

Figure 9:
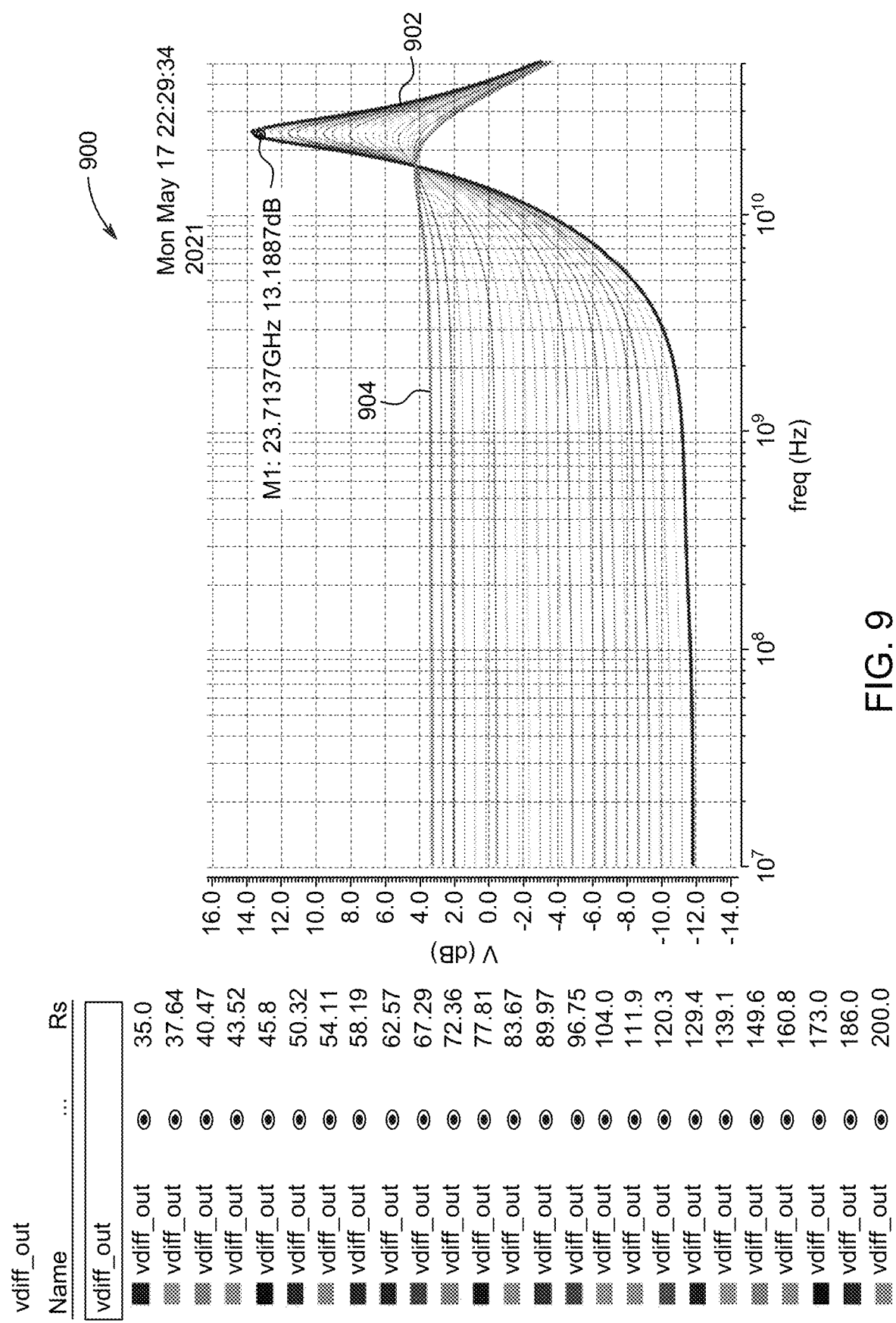
FIG. 9 is a graphical representation depicting simulation results of high frequency gain when $R_L$ value is changed in accordance with an embodiment of the present disclosure.

FIG. 9 is a graphical representation depicting simulation results 900 of high frequency gain when the $R_L$, 710A-B value is changed in accordance with an embodiment of the present disclosure. The SPICE simulation results are changed when $R_L$, is swept from 35 Ohms to 200 Ohms. As shown in FIG. 9, the low-frequency gain can be changed from 4 dB to –12 dB. Moreover, the amplification at high frequency can be adjusted when changing $R_L$, 710A-B. The high frequency gain is adjusted from 4 dB to 13 dB when changing $R_L$, 710A-B from 35 Ohms to 200 Ohms.

FIG. 10 is a circuit diagram illustrating a second active transconductance 1000 in accordance with an embodiment of the present disclosure. The multi-stage CTLE 100 also comprises a second stage resistive load 106. The second stage resistive load 106 provides a tuneable equalization and uses a fine or coarse equalization calibration algorithm. To implement the second active transconductance stage $G_{m2}$ 1000, current reuse topology is employed to reduce power consumption. The second stage resistive load 106 is configured to provide a tuneable equalization and low frequency fine equalization by employing a fine equalization mechanism.

In such an embodiment, the second active transconductance $G_{m2}$ 1000 includes the source degeneration network 1002A-N and 1002B-N of resistance 1006A-B and capacitance 1004A-B and where N=the number of slices. The resistance 1006A-B and capacitance 1004A-B are implemented by using a MOSFET switch and a varactor diode respectively.

Figure 11:
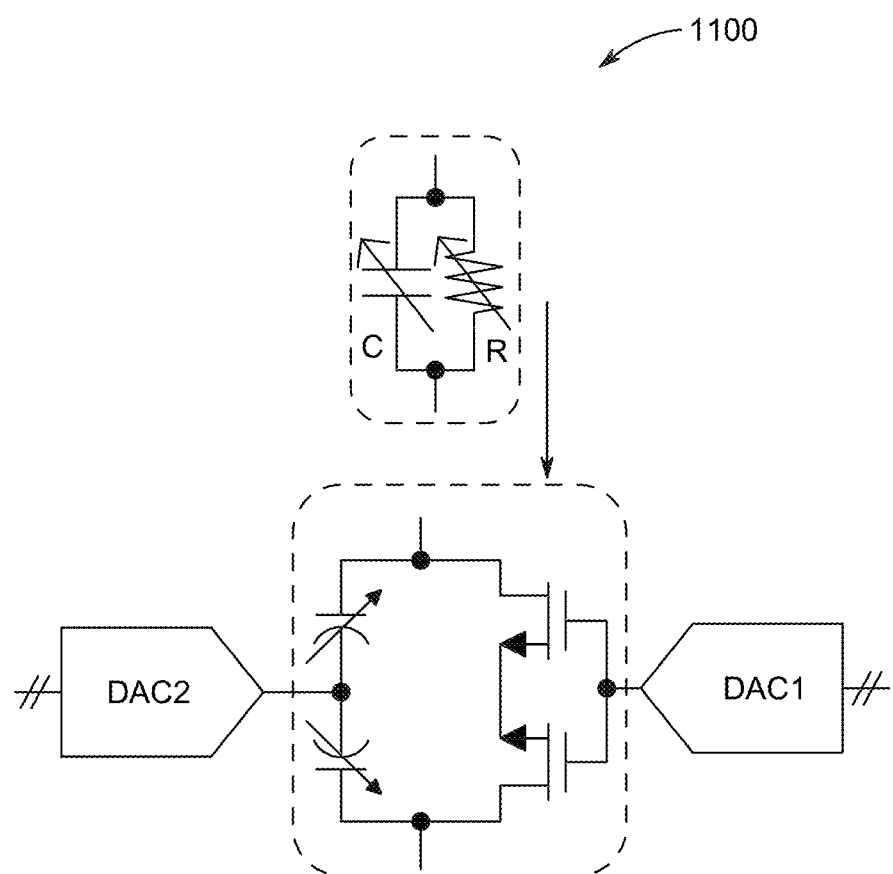
FIG. 11 is a circuit diagram illustrating a source degeneration network of resistance and capacitance in accordance with an embodiment of the present disclosure.

FIG. 11 is a circuit diagram illustrating a source degeneration network 1100 of resistance 1006A-B and capacitance 1004A-B of FIG. 10 in accordance with an embodiment of the present disclosure. A source degeneration network 1100 of resistance 1006A-B and capacitance 1004A-B is controlled by connecting and disconnecting a number of transconductance slices 202A-N. The number of source degeneration slices 202A-N connected or disconnected are determined by monitoring the pulse response of an incoming signal and carrying one or both of the two measurements. The two measurements include the rms sum of post and pre cursors and H2 annulment. The resistance and capacitance are present in both or one of the MOS banks such as PMOS and NMOS.

Figure 12:
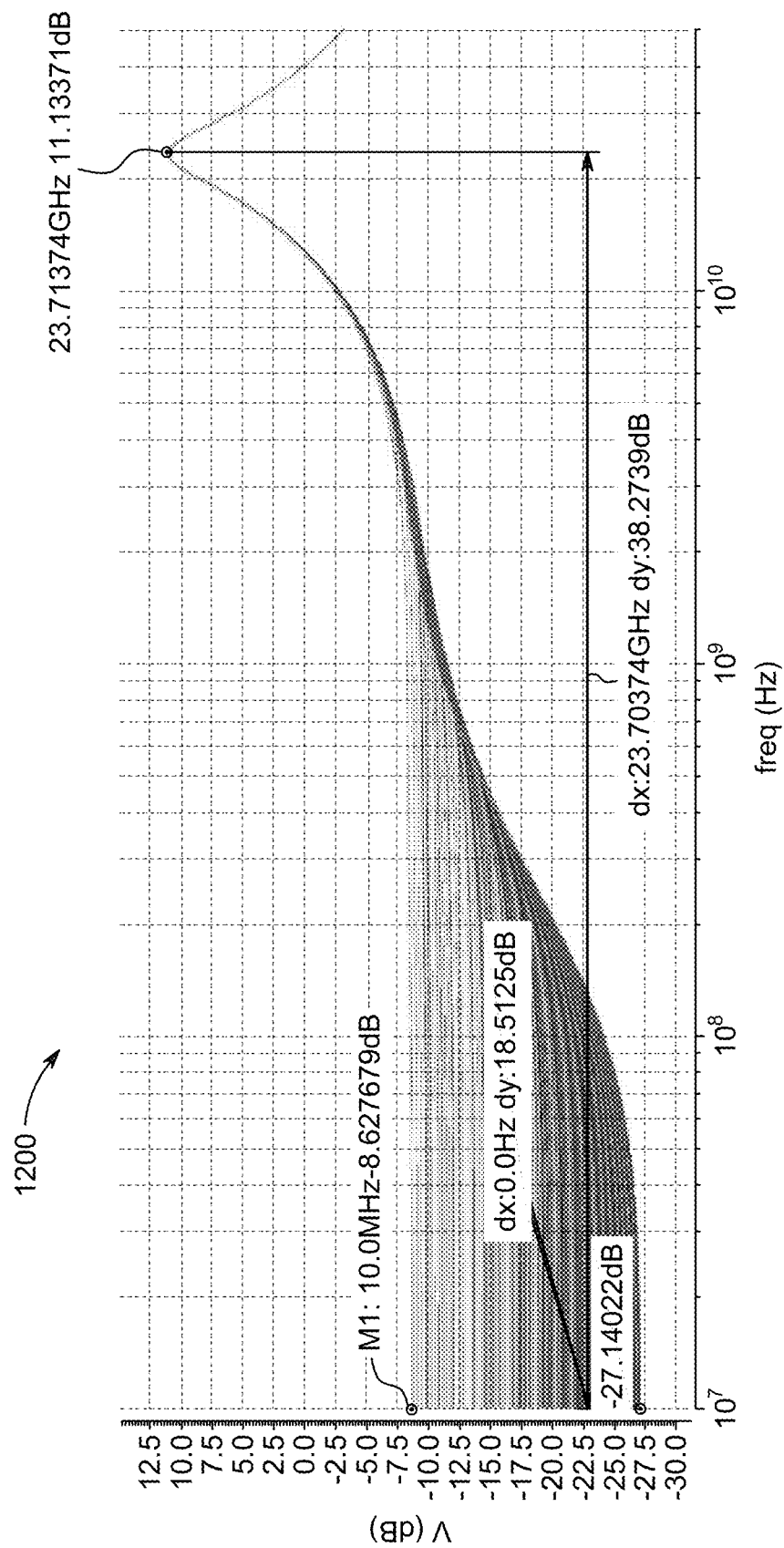
FIG. 12 is a graphical representation of simulation for an entire transfer function of the multi-stage CTLE with the source degeneration network being swept across its entire range as shown in FIG. 10, in accordance with an embodiment of the present disclosure.

FIG. 12 is a graphical representation of the simulation of the entire transfer function 1200 of the multi-stage CTLE 100 with the source degeneration network being swept across its entire range as shown in FIG. 10 in accordance with an embodiment of the present disclosure. After setting the peak frequency to the desired value (by using first stage i.e., $G_{m1}$ 102A with the load), the second stage resistive load 106 can be calibrated via a background calibration loop to provide the required equalization. This simulation shows up to 38 dB equalization.

Figure 13:
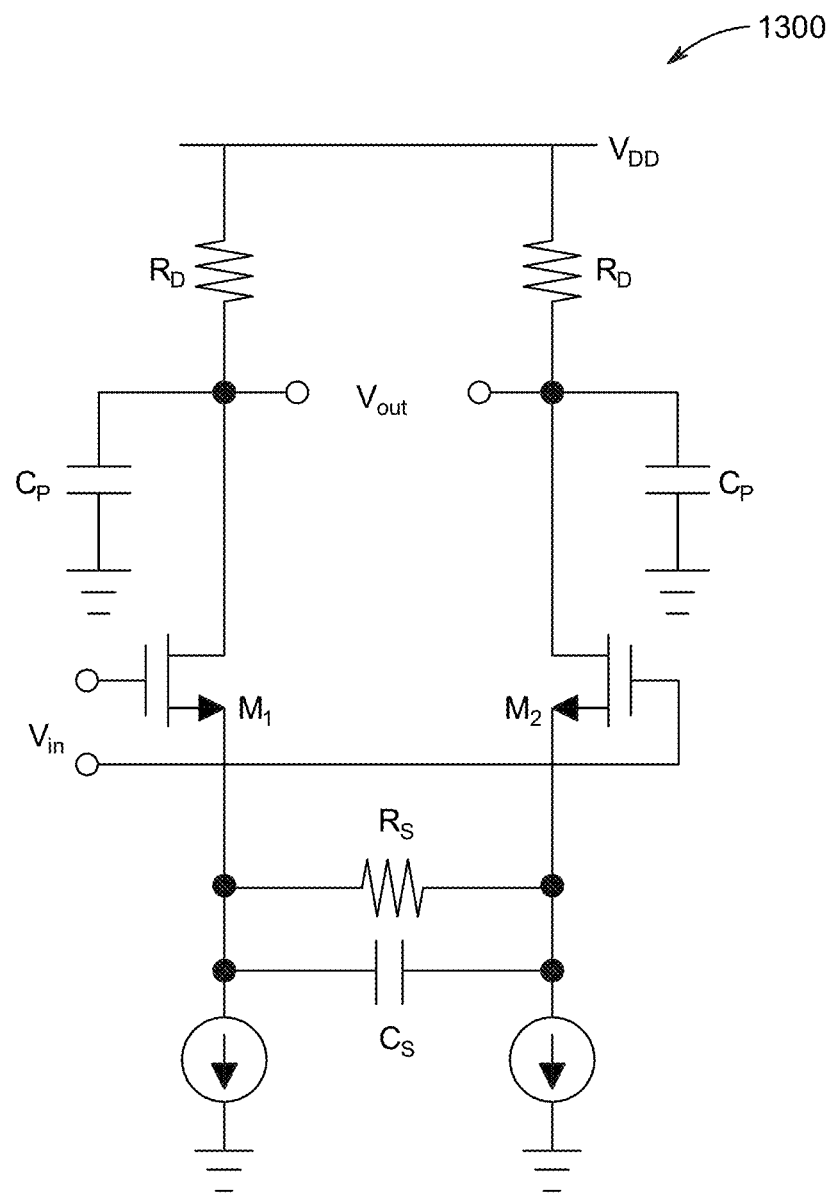
FIG. 13 is a circuit diagram depicting an exemplary traditional degenerated CTLE used in second stage to implement fine equalization mechanism in accordance with an embodiment of the present disclosure.

FIG. 13 is a circuit diagram 1300 depicting an exemplary traditional degenerated CTLE 100 used in the second stage to implement a fine equalization mechanism in accordance with an embodiment of the present disclosure. This is a traditional CTLE circuit. This traditional CTLE may be used in conjunction with the first stage. The first stage performs peaking and the second stage performs equalization.

Figure 14:
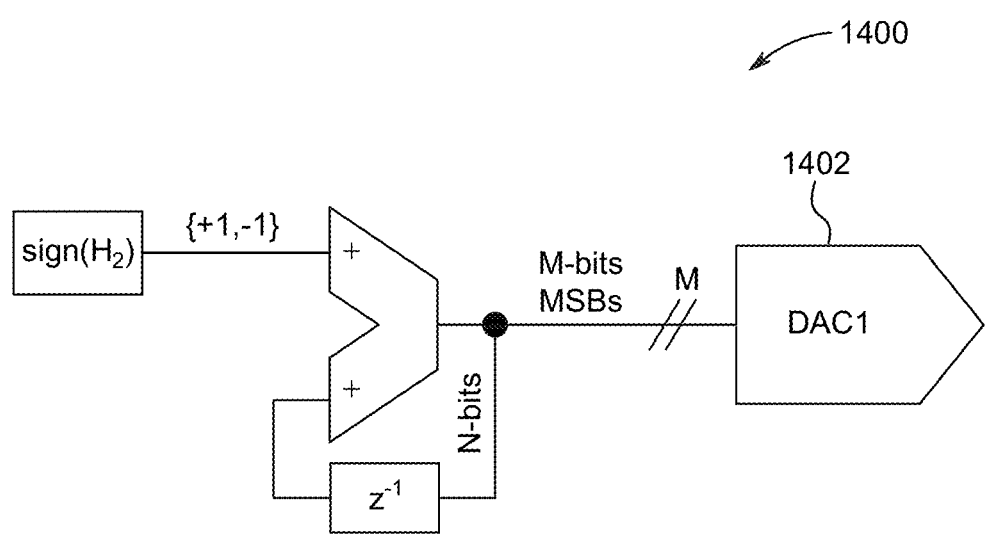
FIG. 14 is a block diagram depicting an accumulator coupled to a DAC to drive the resistor in turn controlling the inductance of the transformer-based inductor, in accordance with an embodiment of the present disclosure.

FIG. 14 is a block diagram 1400 depicting an accumulator coupled to a DAC 1402 to drive the resistor, which in turn controls the inductance of the transformer-based inductor in accordance with an embodiment of the present disclosure. Upon calibration of the first stage transformer-based inductive-peaking 104 and the second stage resistive load 106 at start-up, data from the two measurements are accumulated in an n-bit accumulator.

Figure 15:
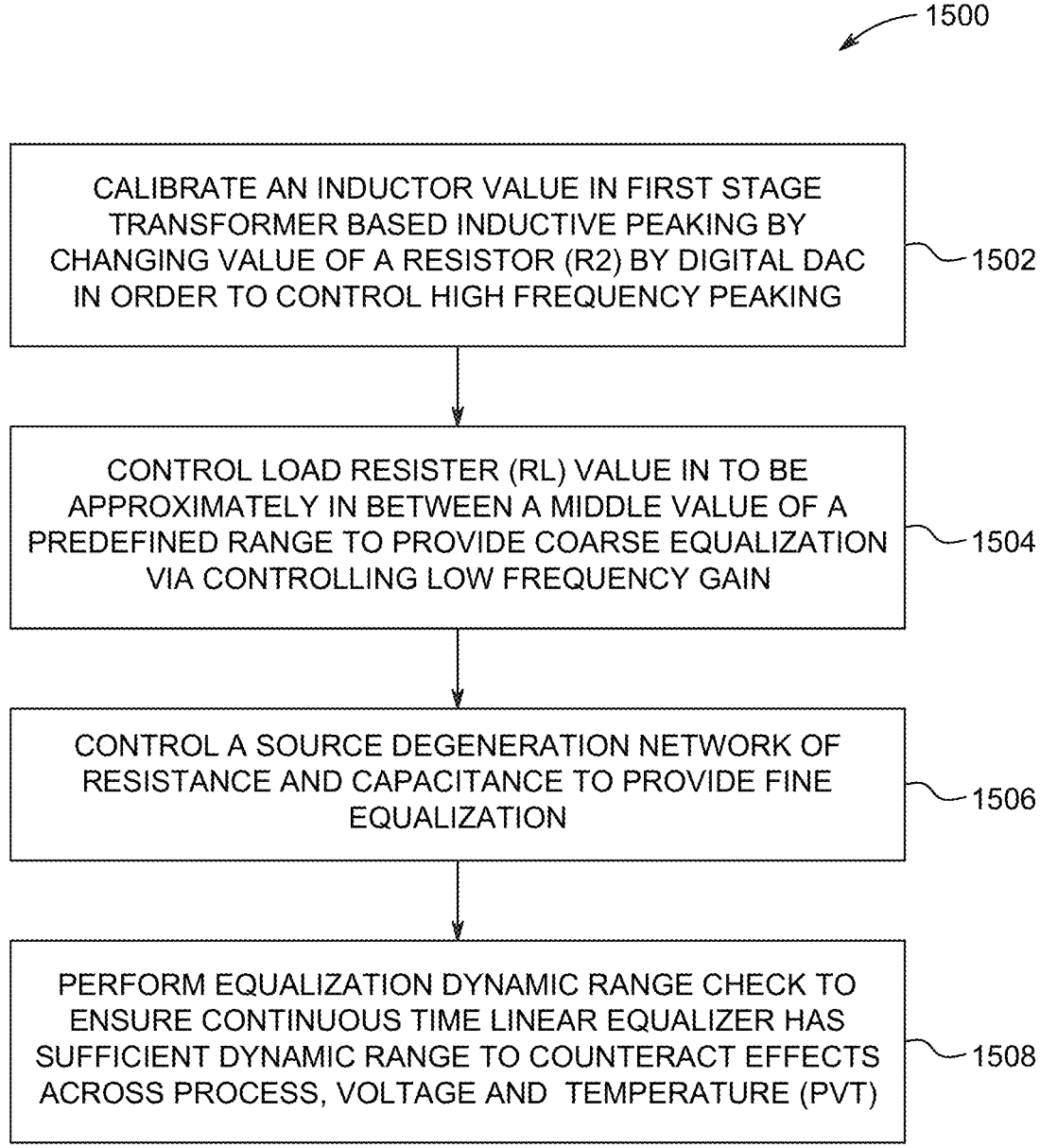
FIG. 15 is a process flow chart illustrating an exemplary method for multi-stage CTLE with a reconfigurable inductor scheme, in accordance with an embodiment of the present disclosure.

FIG. 15 is an exemplary process flow diagram illustrating a method 1500 for the multi-stage CTLE with a reconfigurable inductor scheme in accordance with an embodiment of the present disclosure. At step 1502, an inductor value is calibrated in a first stage transformer-based inductive-peaking 104 by changing value of an active or passive resistor $R_2$ 307 by digital via a DAC 604 in order to control high frequency peaking.

At step 1504, a load resistor ($R_L$) 710A-B value is controlled to be approximately in between a middle value of a predefined range to provide coarse equalization via controlling low-frequency gain.

At step 1506, a source degeneration network 1002A-N of resistance 1012 and capacitance 1010 is controlled to provide fine equalization.

At step 1508, an equalization dynamic range check is performed to ensure the CTLE has sufficient dynamic range to counteract effects across PVT.

In controlling the load resistor $R_L$ 710A-B value to be approximately in the middle value of the predefined range to provide coarse equalization via controlling the low frequency gain, the multi-stage CTLE method 1500 comprises determining number of source degeneration network (or slices) 1002A-N connected or disconnected by monitoring the pulse response of an incoming signal and carrying one or both of two measurements. The two measurements include rms sum of post and pre cursors and H2 annulment.

The multi-stage CTLE method 1500 further comprises determining whether a target value of the two measurements is reached. The multi-stage CTLE method 1500 further comprises terminating the fine equalization procedure upon determining that the target value of the two measurements are reached.

In performing the equalization dynamic range check to ensure the CTLE has sufficient dynamic range to counteract effects across the PVT, the multi-stage CTLE method 1500 comprises determining whether the fine equalization code in the second stage resistive load 106 is not centered or optimal. In performing the equalization dynamic range check, the method 1500 further comprises changing the value of the load resistance $R_L$ 710A-B during fine equalization mechanism based on the following conditions:

At condition A, if the fine equalization code is equivalent to a lower code bound, then the value of the load resistance $R_L$ 710A-B is increased by $R_L$ Code=$R_L$ Code+1 resulting in decrease in the amount of coarse equalization in the first stage transformer-based inductive-peaking 104 and thereby increasing the fine equalization required in the second stage resistive load 106.

At condition B, if the fine equalization code is equivalent to upper code bound, then decreasing the value of the load resistance $R_L$ 710A-B by $R_L$ Code=$R_L$ Code−1 resulting in increase in the amount of coarse equalization in the first stage transformer-based inductive-peaking 104 and thereby reducing the fine equalization required in the second stage resistive load 106.

The process steps above are repeated until the fine equalization code is determined to be approximately in the center of the predefined equalisation codes.

In controlling the value of the passive resistor $R_2$ 306 on the secondary coil $L_2$ modifies effective inductance at primary coil. The effective inductance is the imaginary part of $Z_{in}$ and can be computed by substituting for:

$$s = \sigma + j\omega \qquad \text{equation (14)}$$

The input impedance is computed by:

$$Z_{in} = L_1 s \times \left(1 - \frac{k_p^2 L_2 s}{R_2 + L_2 s}\right) \qquad \text{equation (15)}$$

The transfer function of the first stage transformer-based inductive-peaking 104 is computed by:

$$H(s) = \frac{V_{o1}(s)}{V_{in}(s)} = G_{m1} \times Z_{load}(s) = \qquad \text{equation (16)}$$

$$(g_{mn} + g_{mp}) \times \frac{R_L R_2 + s(R_L L_2 + L_1 R_2) + s^2 L_1 L_2 (1 - k_p^2)}{R_2 + s(L_2 + C_L R_L R_2) + s^2(R_L L_2 C_L + L_1 R_2 C_L) + s^3 L_1 L_2 C_L (1 - k_p^2)}$$

H(s) is the transfer function. In this case, $V_{o1}(s)$ 708A-B is the output voltage to the first stage transformer-based inductive-peaking 104. In this case, Vin (s) 702A-B is the input voltage to the first stage transformer-based inductive-peaking 104, $G_{m1}$ 704A is the first active transconductance, $Z_{load}$ (s) is the load impedance value, gmn is transconductance of the NMOS device in differential pair, the gmp is the transconductance of the PMOS device in differential pair respectively, $R_L$ 710A-B is the load resistor, $R_2$ 306 is the active/passive resistor, $C_L$ 718A-B is the load capacitance, $V_{cm}$ 706 is the center tap of the differential inductor $L_1$ 712A-B, $L_2$ 714 is the secondary inductor, $k_p$ is the coupling factor, and s is the Laplace transform symbol:

$$(s = \sigma + j\omega) \qquad \text{equation (17)}$$

The present invention includes various advantages including a multi-stage CTLE 100 approach which helps reduce the input capacitance of the receiver and hence in turn increasing the input bandwidth of the receiver. The multi-stage CTLE 100 approach helps reduce the input noise figure of the receiver and hence increases the BER performance of the receiver.

Various embodiments of the present disclosure relate to the multi-stage CTLE with a reconfigurable inductor scheme. The multi-stage CTLE provides a compact design and layout for supporting multi-band applications. The multi-stage CTLE employs a single-coil inductive load for multiple frequency bands without any drawback on area or inductor performance. In such embodiment, a single transformer-based inductor may be fine-tuned via digital assisted components. The multi-stage CTLE design helps to reduce the input capacitance of the receiver and thereby increase the input bandwidth of the receiver. The multi-stage CTLE design also helps to reduce the input noise figure of the receiver and hence increase the Bit Error rate (BER) performance of the receiver.

Furthermore, the compact proposed design achieves power saving by employing inductive peaking to reduce power consumption. A stacked NMOS/PMOS amplifier based on current reuse topology is being used.

The disclosed CTLE may support non-return-to-zero (NRZ) signalling, as well as pulse amplitude modulation X (PAM-X, where X=the number of levels). In such embodiment, the amount of equalization may be adjusted from 0 dB to 40 dB through configurable analog elements.

The present design of the CTLE 100 supports different data rates and facilitates layout integration, as the CTLE 100 now comprises of a single inductor rather than having multiple inductors in order to support different data rates. The present design of the CTLE 100 is also power efficient as the CTLE 100 consumes dynamic power consumption and does not consume active power when compared to state-of-the-art implementations. The present design of the CTLE 100 achieves transformer-based passive inductive peaking, a CTLE 100 with current reuse topology which has an inductive load and configurable elements to adapt the amplifiers frequency response.

Further, the present design of the CTLE 100 provides a tuneable inductor using a transformer topology, which is passive, and changes return path. In the present design, the two return paths of the primary coil and the secondary coil are stacked on top of each other and closely coupled through induced magnetic field. When the resistance value is changed in the secondary coil, it changes magnetic field and the induced magnetic field of the primary coil is changed, thus, the effective inductance seen from primary coil is changed.

The present disclosure provides a novel algorithm to adjust the peak frequency and peak magnitude of the first stage and control bandwidth limit feature into the first stage ($R_L$). In the present design of the CTLE 100, the load resistor 710A-B in the first stage, essentially, has an independent control. In some channels, where there is no loss, the need to equalize the channel does not exist. In such a case, bandwidth is required to be limited. This is achieved by turning the first stage into a bandwidth limit as well, rather than just an equalizer, so rather than having peaking, the bandwidth is limited. In a case where 12 dB of gain is required, 6 dB of gain is applied in the first stage, then 6 dB in the second stage. The CTLE 100 reduces the input capacitance due to miller effect which is directly proportional to the gain in the first stage. In the present design, inherently if the gain of the first stage is reduced to provide 6 dB, rather than having to provide 12 dB, this means the CTLE 100 has inherently low input miller capacitance associated to it. Hence, because the input capacitance of the receiver is reduced, the bandwidth is increased. Therefore, the present disclosure provides a multi-stage CTLE 100 approach which helps reduce the input capacitance of the receiver and hence increase the input bandwidth of the receiver.

Additionally, the present disclosure provides a multi-stage CTLE 100 approach which helps reduce the input noise figure of the receiver and hence increasing the BER performance of the receiver. Specifically, the first stage of the CTLE 100, which is based on inductive peaking inherently produces more gain in comparison to the state-of-the art CTLE's. The noise which is observed at the output of the CTLE 100 is composed purely of the thermal noise of the transistors which is much lower when compared to state-of-the-art resistively loaded CTLE's where the output noise is composed of the thermal noise of the transistors and the thermal noise of the resistor load. Hence, the first stage has a low noise figure, which improves the performance of the receiver.

Further, in the present design, a CTLE 100 with CMOS topology which enables a high-Q load inductor is realized. As the resistor in series ($R_L$) with the first winding can be extremely low, the output common-mode is defined by a low-impedance voltage source. The voltage source which sets the output common-mode is thus connected to the center tap $V_{CM}$ 706 of the first winding. This is a vital feature as CML topologies do not have the freedom of changing the output common-mode as the output common-mode in CML topologies is defined by the DC current in the load resistor. Specifically, the load resistance may be dropped down to even 10 ohms, or even five as required. This is only enabled by the CMOS topology or the current reuse amplifier. The reason here is that the $V_{CM}$ 706 or the output common-mode or the DC level is set by the $V_{CM}$ 706 through the center tap of the inductor. The center tap of the inductor $V_{CM}$ 706 can be connected to a voltage source or to a common-mode feedback amplifier, which is in feedback, which is connected to a voltage source. This produces a low impedance path for the voltage source fed to the center tap $V_{CM}$ 706. Hence, this voltage is controlled by changing the reference to the amplifier in turn changing the $V_{CM}$ 706. However, there is no DC current in the topology of the CTLE 100 presented in this disclosure. Therefore, $V_{CM}$ 706 may be trimmed. As $V_{CM}$ 706 can be independently trimmed, $R_L$ 710A-B can be changed to the desired value orthogonally without changing the output common-mode. This means that when $R_L$ has a low value, if the series resistance to the inductor is decreased, the Q factor is increased. This is a unique characteristic of the CTLE 100 presented. In FIG. 9, curve 902 is the simulation response of CTLE 100 when the $R_L$ is 35 ohms. This means it has a very narrow peak, as the inductor at the load has a high Q. However, as the $R_L$ is increased, close to 200 ohms, the Q of the inductor can be substantially dropped as can be observed in the curve 904 in FIG. 9. This is where CTLE 100 rather than providing equalisation performs a bandwidth limit function instead. Therefore, the Q of the inductor can be controlled in this present design. But not only that, because the Q is controlled, and is decoupled from the common-mode, there exists an independent mechanism to control the common-mode by $V_{CM}$ 706 through a reference generator or voltage reference generator. This is a very useful feature. The reason is when driving the amplifier in the second stage, depending on the common-mode, different types of input pairs (i.e., NMOS or PMOS) may be used. Therefore, the present disclosure also provides a CTLE 100 with CMOS topology which enables a variable output common-mode as the output common-mode can be defined by a low-impedance voltage $V_{CM}$ 706 source connected to the center tap of the first winding.

Further, the present design of CTLE 100 may be implementable on, for example, a multi-data rate transceiver circuit. Considering a scenario where there are three different channels with three different loss profiles which need to be connected to the transceiver at the same frequency. As the receiver will see a different loss for different data rates and channels, the receiver should be able to effectively equalize the loss of the channel and obtain optimal BER performance. Hence, we require a CTLE 100 which has an adjustable peaking frequency and adjustable gain. The present invention provides such a CTLE 100 where the gain and the peak of CTLE 100 can be adjusted independently of each other.

Generally, in receivers using CTLE's, if a channel has low loss, the signal is needlessly equalised and amplified. The latter leads to a higher voltage signal swing which is much larger than the swing for which the proceeding circuits in the receiver chain are designed for. Such high voltage swings loads the proceeding circuits after the CTLE and makes them nonlinear. Traditionally, attenuators are added in the signal chain before or after the CTLE to attenuate the high voltage swing of the CTLE in cases where the channel loss is low. Hence, dedicated attenuators with bandwidth limit are built and used to ensure the circuits in the signal chain are linear. The present design of CTLE 100 gets around this problem and does not require dedicated attenuators with bandwidth limit by changing the value of $R_L$ to realise the required functionality of an attenuator with bandwidth limit.

Therefore, there is no need to add an extra stage of attenuator or a bandwidth limit in the present disclosure. The CTLE 100 either enables or disables peaking. This is achieved by the $R_L$ 710A-B. These two control mechanisms of moving the peaking frequency and enabling or disabling the peak is achieved by first stage of the CTLE 100, which is what is referred to as the first stage transformer inductive-peaking 104. On the other hand, equalization refers to difference between frequency peak and DC gain. Through the present design of the CTLE 100, the equalization may also be changed. Traditionally, equalization is achieved through a coarse mechanism which is not usually well controlled, hence we require a fine equalization mechanism. This is where the second stage is used. Hence, the first stage provides the peaking frequency control, a coarse equalization mechanism, and bandwidth limit functionality.

The second stage is another equalizer and provides tuneable equalization to enable fine and coarse equalization algorithms to effectively equalize the channel and obtain optimum BER performance. The first stage is a coarse equalizer, and the second stage is a fine equalizer. In the present design, there are no inductors in the second stage equalizer. The source is degenerated, both on top of the PMOS and at the bottom of the NMOS. The peaking frequency and coarse equalization is set by the first stage and while the second stage is controlled to provide fine equalization steps of 0.1 dB from 10 dB to 27 dB (as shown in FIG. 12).

Overall, there does not exist a system which describes the use of a single coil transformer-based with multiple frequency bands. Also, the embodiments in this present invention allow equalization to be applied and the ability to independently shift the peaking frequency without affecting the equalization.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A multi-stage continuous time linear equalizer (CTLE) with a reconfigurable inductor scheme, the multi-stage CTLE comprising:
   a first stage transformer-based inductive-peaking configured to control high frequency peaking and set a peaking frequency to a desired value by performing a coarse equalization mechanism, wherein the first stage transformer-based inductive-peaking comprises:
      a first active transconductance ($G_{m1}$) employed with current reuse topology to improve power consumption for a given amplification;
      a passive transformer-based inductive load based on a transformer structure comprising:
         a primary coil composed of a center-tap differential inductor ($L_1$) configured to provide symmetric structure for signal amplification;
         a common-mode voltage ($V_{CM}$) fed through a center tap; and
         a secondary coil electromagnetically coupled to the primary coil, wherein the secondary coil comprises a resistor ($R_2$) placed in parallel to a secondary inductor ($L_2$); and
      a load resistor ($R_L$) electrically connected in series with the first active transconductance ($G_{m1}$) and the passive transformer-based inductive load; and
   a second stage resistive load configured to provide tunable low frequency fine equalization by performing a fine equalization mechanism, wherein the second stage resistive load comprises:
      a second active transconductance ($G_{m2}$) employed with current reuse topology, wherein the second active transconductance ($G_{m2}$) comprises:
      a source degeneration network of resistance and capacitance, and wherein the resistance and capacitance are implemented by using a metal-oxide semiconductor field-effect transistor (MOSFET) switch in triode and varactor diode respectively.

2. The multi-stage CTLE of claim 1, wherein the first stage transformer-based inductive-peaking and the second stage resistive load are calibrated by:
   performing the coarse equalization mechanism comprising:
   i) calibrating an inductor value in the first stage transformer-based inductive-peaking by changing a value of the resistor ($R_2$) digitally via a digital to analog converter (DAC) to control the high frequency peaking; and
   ii) controlling a value of the load resistor ($R_L$) to be approximately between a middle value of a predefined range to provide coarse equalization via controlling a low-frequency gain; and performing the fine equalization mechanism comprising:
   iii) controlling the source degeneration network of the resistance and the capacitance in the second stage resistive load to provide fine equalization; and
   iv) performing an equalization dynamic range check to ensure the multi-stage CTLE has sufficient dynamic range to counteract effects across Process, Voltage, and Temperature (PVT).

3. The multi-stage CTLE of claim 2, wherein the source degeneration network of the resistance and the capacitance is controlled by connecting and disconnecting a number of source degeneration slices, and wherein the number of source degeneration slices connected and disconnected are determined by monitoring a pulse response of an incoming signal and carrying at least one of the following two measurements: a) root mean square (RMS) sum of post and pre cursors and b) $H_2$ annulment, wherein $H_2$ is a value of the pulse response of the incoming signal after 2 unit intervals (UI).

4. The multi-stage CTLE of claim 3, wherein a fine equalization procedure is terminated when a target value of the at least one of the following two measurements is reached.

5. The multi-stage CTLE of claim 3, wherein upon calibration of the first stage transformer-based inductive-peaking and the second stage resistive load at start-up, data from the at least one of the following two measurements are accumulated in an n-bit accumulator, wherein n represents a real number.

6. The multi-stage CTLE of claim 2, wherein the equalization dynamic range check is performed by:
   determining whether a fine equalization code in the second stage resistive load is not centered, wherein centered is defined as within a pre-defined tolerance from all possible fine equalization codes;
   changing the value of the load resistor ($R_L$) during the fine equalization mechanism based on the following conditions:
      a) respondent to the fine equalization code is equivalent to a lower code bound, increasing the value of the load resistor ($R_L$) by $R_L$ Code=$R_L$ Code+1 resulting in decrease in the amount of the coarse equalization in the first stage transformer-based inductive-peaking and thereby increasing the fine equalization required in the second stage resistive load; and
      b) respondent to the fine equalization code is equivalent to an upper code bound, decreasing the value of the load resistor ($R_L$) by $R_L$ Code=$R_L$ Code−1 resulting in increase in the amount of coarse equalization in the first stage transformer-based inductive-peaking and thereby reducing the fine equalization required in the second stage resistive load;
   wherein the steps ii)-iv) in claim 2 are repeated until the fine equalization code is determined to be a centered code.

7. The multi-stage CTLE of claim 1, wherein the first active transconductance ($G_{m1}$) is composed of a plurality of slices which are turned ON-OFF independently through digital configuration.

8. The multi-stage CTLE of claim 1, wherein the first active transconductance ($G_{m1}$) and the second active transconductance ($G_{m2}$) are employed with current reuse topology by using a stacked N-channel metal-oxide semiconductor (NMOS)/P-channel metal-oxide semiconductor (PMOS) amplifier.

9. The multi-stage CTLE of claim 1, wherein the multi-stage CTLE supports non-return-to-zero (NRZ) signaling and pulse amplitude modulation X-levels (PAM-X), wherein X represents a real number.

10. The multi-stage CTLE of claim 1, wherein the passive transformer-based inductive load employs a single structure for different frequencies.

11. The multi-stage CTLE of claim 1, wherein controlling the value of the resistor ($R_2$) of the secondary coil modifies an effective inductance at the primary coil and wherein the effective inductance is an imaginary part of an input impedance (Zin) by replacing s=σ+jω, wherein s is Laplace operator, σ is a real part of the Laplace operator and jω represents an imaginary part of the Laplace operator.

12. The multi-stage CTLE of claim 1, wherein the resistor ($R_2$) comprises of a passive resistor and a transistor-based resistor, wherein a gate of the transistor-based resistor is driven by a voltage generated by a digital to analog converter (DAC) controlled by configuration bits.

13. The multi-stage CTLE of claim 1, wherein a transfer function of the first stage transformer-based inductive-peaking is computed based on an output voltage ($V_{o1}$) from the first stage transformer-based inductive-peaking, an input voltage ($V_{in}$) to the first stage transformer-based inductive-peaking, the first active transconductance ($G_{m1}$), a load impedance value ($Z_{load}$), a transconductance of an N-channel metal-oxide semiconductor (NMOS) device ($G_{mn}$) in differential pair and a transconductance of a P-channel metal-oxide semiconductor (PMOS) device ($g_{mp}$) in differential pair respectively, the load resistor ($R_L$), the resistor ($R_2$), a load capacitance ($C_L$), the center-tap differential inductors ($L_1$), the secondary inductor ($L_2$), a coupling factor ($k_p$), and a Laplace transform symbol.

14. The multi-stage CTLE of claim 1, wherein the second stage resistive load further comprises a variant which has the source degeneration network of resistance and capacitance on at least one of N-channel metal-oxide semiconductor (NMOS) transistor and a P-channel metal-oxide semiconductor (PMOS) transistor section.

15. The multi-stage CTLE of claim 1, further comprising a complementary metal-oxide semiconductor (CMOS) topology enabling a high-Q load inductor to be realized as the load resistor ($R_L$) in series with the primary coil.

16. The multi-stage CTLE of claim 15, wherein the CMOS topology enables a variable output common-mode and the variable output common-mode is defined by a low-impedance variable $V_{CM}$ source connected to the center tap of the primary coil.

17. A multi-stage continuous time linear equalizer (CTLE) method with a reconfigurable inductor scheme, the method comprising:
calibrating a first stage transformer-based inductive-peaking by:
i) calibrating an inductor value in the first stage transformer-based inductive-peaking by changing a value of a resistor ($R_2$) digitally via a digital to analog convertor (DAC) to control high frequency peaking; and
ii) controlling a value of a load resistor ($R_L$) in between a middle value of a predefined range to provide coarse equalization via controlling a low-frequency gain; and
calibrating a second stage resistive load by:
iii) calibrating fine equalization by controlling a source degeneration network of resistance and capacitance by monitoring a pulse response of an incoming signal and carrying at least one of the following two measurements: a) root mean square (RMS) sum of post and pre cursors and b) $H_2$ annulment, wherein $H_2$ is a value of the pulse response of the incoming signal after 2 unit intervals (UI); and
iv) performing equalization dynamic range check to ensure the multi-stage CTLE has sufficient dynamic range to counteract effects across Process, Voltage, and Temperature (PVT) and to calibrate the second stage resistive load.

18. The multi-stage CTLE method of claim 17, wherein controlling the value of the load resistor ($R_L$) in between the middle value of the predefined range to provide the coarse equalization via controlling the low-frequency gain comprises:
determining a number of source degeneration slices connected and disconnected by monitoring the pulse response of the incoming signal and carrying at least one of the following two measurements: a) the RMS sum of the post and pre cursors and b) the $H_2$ annulment, wherein;
determining whether a target value of the two measurements is reached; and
terminating a fine equalization procedure upon determining that the target value of the two measurements is reached.

19. The multi-stage CTLE method of claim 18, wherein a transfer function of the first stage transformer-based inductive-peaking is computed based on an output voltage ($V_{o1}$) from the first stage transformer-based inductive-peaking, an input Voltage ($V_{in}$) to the first stage transformer-based inductive-peaking, a first active transconductance ($G_{m1}$), a load impedance value ($Z_{load}$), a transconductance of an N-channel metal-oxide semiconductor (NMOS) device ($G_{mn}$) in differential pair and a transconductance of a P-channel metal-oxide semiconductor (PMOS) device ($G_{mp}$) in differential pair respectively, the load resistor ($R_L$), the resistor ($R_2$), a load capacitance ($C_L$), a center-tap differential inductors ($L_1$), a secondary inductor ($L_2$), a coupling factor ($k_p$), and a Laplace transform symbol.

20. The multi-stage CTLE method of claim 17, wherein performing the equalization dynamic range check to ensure the multi-stage CTLE has sufficient dynamic range to counteract effects across the Process, Voltage and Temperature (PVT) comprises:
determining whether fine equalization code in the second stage resistive load is not centered and optimal; and
changing the value of the load resistor ($R_L$) using a fine equalization mechanism based on the following conditions:
a) if the fine equalization code is equivalent to a lower code bound, then increasing the value of the load resistor ($R_L$) by $R_L$ Code=$R_L$ Code+1 resulting in decrease in the amount of coarse equalization in the first stage transformer-based inductive-peaking and thereby increasing the fine equalization required in the second stage resistive load; and
b) if the fine equalization code is equivalent to an upper code bound, then decreasing the value of the load resistor ($R_L$) by $R_L$ Code=$R_L$ Code−1 resulting in increase in the amount of coarse equalization in the first stage transformer-based inductive-peaking and thereby reducing the fine equalization required in the second stage resistive load; and wherein the process steps ii)-iv) in claim 17 are repeated until the fine equalization code is determined to be in a centered code.

21. The multi-stage CTLE method of claim 17, further comprising controlling the value of the resistor ($R_2$) of a secondary coil to modify effective inductance at a primary coil,
wherein the effective inductance is an imaginary part of an input impedance (Zin) by replacing s=σ+jω, wherein Laplace operator, $\sigma$ is a real part of the Laplace operator and $j\omega$ represents an imaginary part of the Laplace operator.

\* \* \* \* \*